United States Patent
Chen et al.

(10) Patent No.: US 11,830,673 B2
(45) Date of Patent: Nov. 28, 2023

(54) METHOD OF PREPARING SOFT CARBON MATERIAL FOR HIGH-VOLTAGE SUPERCAPACITOR AND ASYMMETRICAL SUPERCAPACITOR

(71) Applicant: CPC CORPORATION, TAIWAN, Kaohsiung (TW)

(72) Inventors: Yan-Shi Chen, Chia-Yi (TW); Gao-Shee Leu, Chia-Yi (TW); Yu-Chien Liu, New Taipei (TW); Chi-Chang Hu, Hsinchu (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 780 days.

(21) Appl. No.: 16/989,819

(22) Filed: Aug. 10, 2020

(65) Prior Publication Data

US 2021/0343485 A1    Nov. 4, 2021

(30) Foreign Application Priority Data

Apr. 30, 2020 (TW) ................. 109114479

(51) Int. Cl.
| | |
|---|---|
| *B32B 9/00* | (2006.01) |
| *H01G 11/86* | (2013.01) |
| *H01G 11/34* | (2013.01) |
| *H01G 11/24* | (2013.01) |
| *C01B 32/348* | (2017.01) |
| *H01G 11/60* | (2013.01) |

(52) U.S. Cl.
CPC .......... *H01G 11/86* (2013.01); *C01B 32/348* (2017.08); *H01G 11/24* (2013.01); *H01G 11/34* (2013.01); *C01P 2002/74* (2013.01); *C01P 2002/78* (2013.01); *C01P 2006/12* (2013.01); *C01P 2006/16* (2013.01); *C01P 2006/40* (2013.01); *H01G 11/60* (2013.01)

(58) Field of Classification Search
CPC ....... Y10T 428/30; B82Y 30/00; H01G 11/86; C01B 32/348; C01P 2002/74; C01P 2006/12; C01P 2006/16; C01P 2006/40
USPC ........................................... 428/408
See application file for complete search history.

(56) References Cited

U.S. PATENT DOCUMENTS

2017/0194105 A1*  7/2017  Zhamu ............... H01G 11/24

FOREIGN PATENT DOCUMENTS

KR         101591264      *  2/2016  ............ H01G 11/86

* cited by examiner

*Primary Examiner* — Daniel H Miller

(57) ABSTRACT

A method of preparing a soft carbon material for high-voltage supercapacitors includes: providing an initial soft carbon material characterized by: (A) a first carbon layer spacing greater than 0.345 nm but less than 0.360 nm; (B) a crystal plane (002) with a length ($L_c$) less than 6 nm; (C) a crystal plane (101) with a length ($L_a$) less than 6 nm; and (D) an intensity ratio ($I_{(002)}/I_{(101)}$) of the crystal plane (002) to the crystal plane (101) obtained by XRD analysis being less than 60; performing an alkaline activation on the initial soft carbon material with an alkaline activator to obtain a first processing carbon material; and performing an electrochemical activation on the first processing carbon material with an electrolyte to obtain the soft carbon material for the high-voltage supercapacitors.

10 Claims, 34 Drawing Sheets

Initial soft carbon material provides step — S1

Alkaline activation step — S2

Electrochemical activation step — S3

```
┌─────────────────────────────────────────────┐
│ Place the alkaline activator and the        │──S21
│ initial soft carbon materials in a mortar   │
└─────────────────────────────────────────────┘

┌─────────────────────────────────────────────┐
│ Mix the alkaline activator and the initial  │
│ soft carbon materials evenly to form the    │──S22
│ mixture particles                           │
└─────────────────────────────────────────────┘

┌─────────────────────────────────────────────┐
│ Gather and put the mixture particles        │──S23
│ in a high-temperature furnace               │
└─────────────────────────────────────────────┘

┌─────────────────────────────────────────────┐
│ Introduce nitrogen gas into the             │──S24
│ high-temperature furnace, and heat it       │
└─────────────────────────────────────────────┘

┌─────────────────────────────────────────────┐
│ Gather the alkaline-activated soft carbon   │
│ materials with deionized water, and         │──S25
│ remove impurities                           │
└─────────────────────────────────────────────┘

┌─────────────────────────────────────────────┐
│ Gather the soft carbon materials which      │
│ has undergone step S25 with an              │──S26
│ air-extracting filtration device            │
└─────────────────────────────────────────────┘

┌─────────────────────────────────────────────┐
│ Use the soft carbon materials gathered in   │
│ step S26 as a sample, and bake the sample   │
│ to remove all the water content and thus    │──S27
│ obtain the first processing carbon material │
│ which has undergone alkaline activation     │
└─────────────────────────────────────────────┘
```

FIG.6

METHOD OF PREPARING SOFT CARBON MATERIAL FOR HIGH-VOLTAGE SUPERCAPACITOR AND ASYMMETRICAL SUPERCAPACITOR

CROSS-REFERENCE TO RELATED APPLICATION

This non-provisional application claims priority under 35 U.S.C. § 119(a) on Patent Application No(s). 109114479 filed in Taiwan, R.O.C. on Apr. 30, 2020, the entire contents of which are hereby incorporated by reference.

BACKGROUND OF THE INVENTION

1. Field of the Invention

The present disclosure relates to a method of preparing a soft carbon material for the applications of high-voltage supercapacitors and asymmetrical supercapacitors using the soft carbon material for use in high-voltage supercapacitors.

2. Description of the Related Art

Capacitors are passive devices for storing electrical energy in the electrical field. Compared with ordinary capacitors, asymmetrical supercapacitors not only show a high energy density and long service life but also can be charged and discharged quickly. Owing to their foregoing high efficiency, asymmetrical supercapacitors are popular.

According to related prior art, the negative electrodes of asymmetrical supercapacitors are made of activated carbon or graphene, whereas the positive electrodes of asymmetrical supercapacitors are made of soft carbon, or graphite.

The prior art further discloses positive electrode materials processed by electrochemical activation with a view to increase the operating voltage of asymmetrical supercapacitors and increase the energy density thereof.

BRIEF SUMMARY OF THE INVENTION

However, if the positive electrodes of asymmetrical supercapacitors are made of graphite, excessive gas will be generated since graphite has a large specific surface area and thus adsorbs water to a great extent. The adsorbed water causes decomposition of electrolytes. Eventually, accumulation of the excessive gas causes an increase in the pressure of the asymmetrical supercapacitors, thereby increasing the chance that their electrodes will get damaged.

It remains unknown as to which soft carbon materials with a small specific surface area are good positive electrode material for asymmetrical supercapacitors and have the symmetrical, capacitor-like, charging and discharging curves, similar to the electric double-layer capacitors (EDLCs).

Although a preliminary ion injection/ejection mechanism in the soft carbon materials is formed by electrochemical activation, specific capacitance is still inadequate. As a result, there is a need to overcome such drawback in the prior art.

To solve the aforesaid problem, it is an aspect of the present disclosure to provide a method of preparing a soft carbon material for high-voltage supercapacitors, comprising: providing an initial soft carbon material characterized by: (A) a first carbon layer spacing greater than 0.345 nm but less than 0.360 nm; (B) a crystal plane (002) with a length ($L_c$) less than 6 nm; (C) a crystal plane (101) with a length ($L_a$) less than 6 nm; and (D) an intensity ratio ($I_{(002)}/I_{(101)}$) of the crystal plane (002) to the crystal plane (101) obtained by XRD analysis being less than 60; performing an alkaline activation on the initial soft carbon material with an alkaline activator to obtain a first processing carbon material; and performing an electrochemical activation on the first processing carbon material with an electrolyte to obtain the soft carbon material for the high-voltage supercapacitors.

In an embodiment, the alkaline activator is at least one selected from the group consisting of alkali metal hydroxide, alkali metal carbonate and alkali metal hydrogen carbonate.

In an embodiment, the first processing carbon material has a specific surface area less than 5 $m^2/g$ and an average pore diameter less than 40 nm.

In an embodiment, the electrochemical activation comprises a cyclic voltammetric scan and a charging-discharging cycle, and the cyclic voltammetric scan is performed on the first processing carbon material for at least three times at 25 mV/s in a potential window of −0.6~2.2 V.

In an embodiment, the cyclic voltammetric scan is performed on the first processing carbon material for at least three times at 25 mV/s in a potential window of −0.6~1.6 V.

In an embodiment, the electrolyte comprises $TEABF_4$ in propylene carbonate.

In an embodiment, the soft carbon material has a second carbon layer spacing greater than 0.50 nm but less than 0.70 nm and is defined as carbon layer spacing of the soft carbon material which has undergone alkaline activation and electrochemical activation.

In an embodiment, the soft carbon material is used as a positive electrode material of an asymmetrical supercapacitor.

It is another aspect of the present disclosure to provide an asymmetrical supercapacitor, which comprises: a positive electrode material being the soft carbon material prepared by the method of the present disclosure; and a negative electrode material being activated carbon.

In an embodiment, the asymmetrical supercapacitor has an operating cell voltage greater than 3.8 V.

To overcome the aforesaid drawbacks of the prior art, the present disclosure provides, in an aspect thereof, a method of preparing, by alkaline activation and electrochemical activation, a soft carbon material for high-voltage supercapacitors, wherein the soft carbon material has specific characteristics (for example, material microstructure alignment). With a low specific surface area, the soft carbon material for high-voltage supercapacitors has charging and discharging curves similar to those of EDLC, which is a symmetrical capacitor.

It is another aspect of the present disclosure to provide an asymmetrical supercapacitor using the soft carbon material of the present disclosure as a positive electrode material.

BRIEF DESCRIPTION OF THE DRAWINGS

FIG. 6 is a flowchart of an alkaline activation in an embodiment of the present disclosure.

DETAILED DESCRIPTION OF THE INVENTION

To facilitate understanding of the object, characteristics and effects of the present disclosure, embodiments together with the accompanying drawings for the detailed description of the present disclosure are provided.

Figure 1:
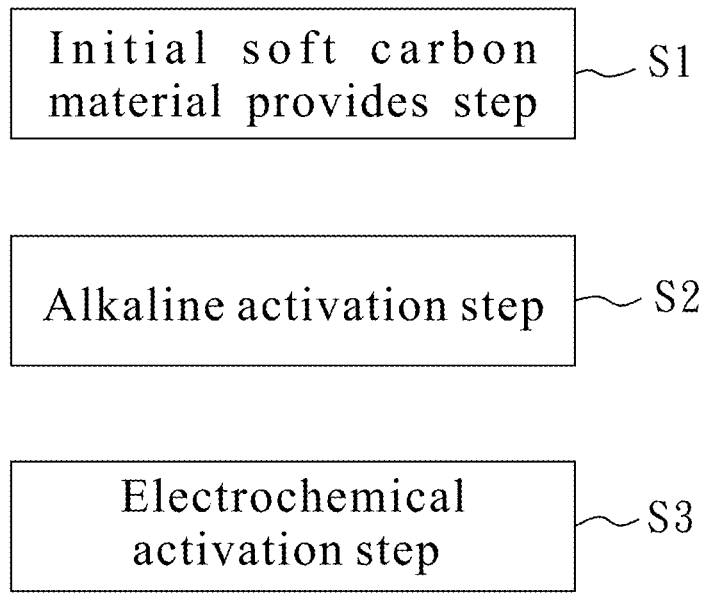
FIG. 1 is a flowchart of a method of preparing a soft carbon material for high-voltage supercapacitors according to an embodiment of the present disclosure.

Referring to FIG. 1, it shows a flowchart of a method of preparing a soft carbon material for high-voltage supercapacitors according to an embodiment of the present disclosure. As shown in FIG. 1, the present disclosure provides a method of preparing a soft carbon material for high-voltage supercapacitors. The method comprises the steps of: providing an initial soft carbon material (S1), an alkaline activation (S2) and an electrochemical activation (S3).

The steps S1-S3 are described below.

S1: Providing an Initial Soft Carbon Material

In the step S1, an initial soft carbon material is provided, and the initial soft carbon material shows the characteristics as follows: (A) a first carbon layer spacing (hereinafter referred to as a carbon layer gap) greater than 0.345 nm but less than 0.360 nm; (B) a crystal plane (002) with a length ($L_c$) less than 6 nm; (C) a crystal plane (101) with a length ($L_a$) less than 6 nm; and (D) an intensity ratio ($I_{(002)}/I_{(101)}$) of the crystal plane (002) to the crystal plane (101) obtained by XRD analysis being less than 60. The foregoing characteristics are confirmed with experiments described below.

Figure 2:
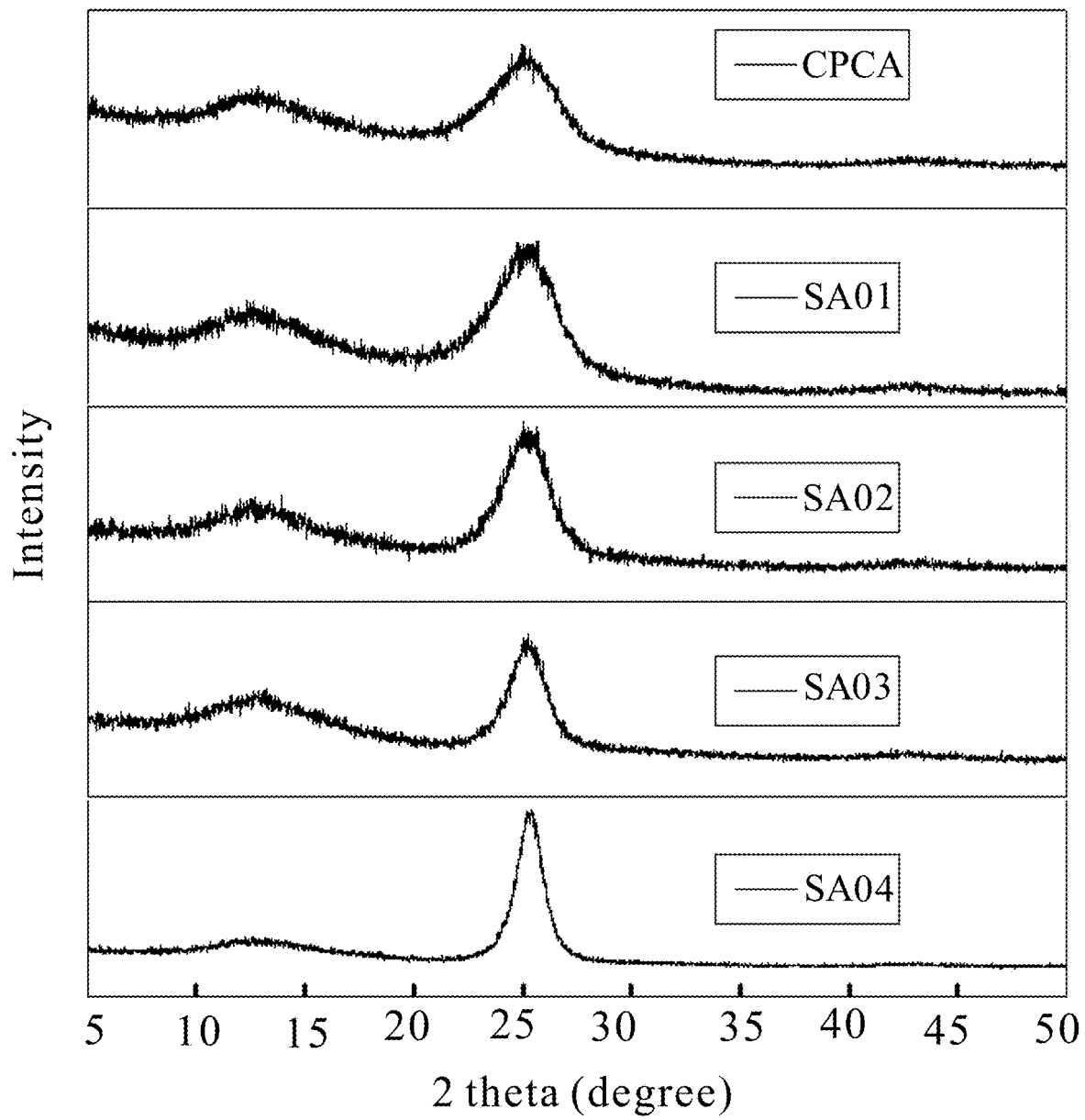
FIG. 2 is an X-ray diffraction spectrum of soft carbon materials of the present disclosure.

Referring to FIG. 2, it shows the X-ray diffraction spectra of the initial soft carbon materials of the present disclosure. The initial soft carbon materials of the present disclosure are indicated as CPCA, SA01, SA02, SA03 and SA04, respectively. The material analysis is performed on the aforesaid five initial soft carbon materials with different crystalline degrees.

As shown in FIG. 2, standard peaks $d_{002}$ of all the five initial soft carbon materials are about at 2θ (2 theta)=25.4°. Each peak $d_{002}$ is widened and is of low peak intensity, indicating that the graphite-like crystallites only partially occupy the matrix of initial soft carbon materials. Furthermore, a carbon layer spacing $d_{002}$ is calculated with the Bragg's diffraction formula: $2d_{hkl} \sin \theta = n\lambda$. The five initial soft carbon materials vary from each other in full-width at half maximum (FWHM) of peak $d_{002}$. As shown in FIG. 2, from top to bottom, the full-widths at half maximum (FWHM) of the peaks $d_{002}$ of the initial soft carbon material (CPCA) to the initial soft carbon material (SA04) decrease.

Figure 3:
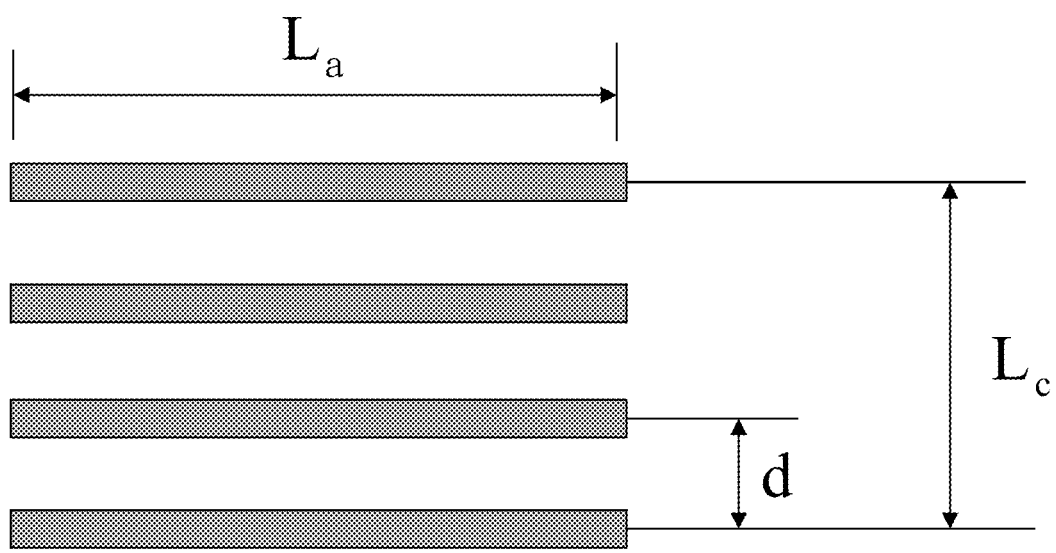
FIG. 3 is a schematic view of $L_c$, $L_a$, and $L_c/d_{002}$ of graphite-like crystallites.
Figure 4:
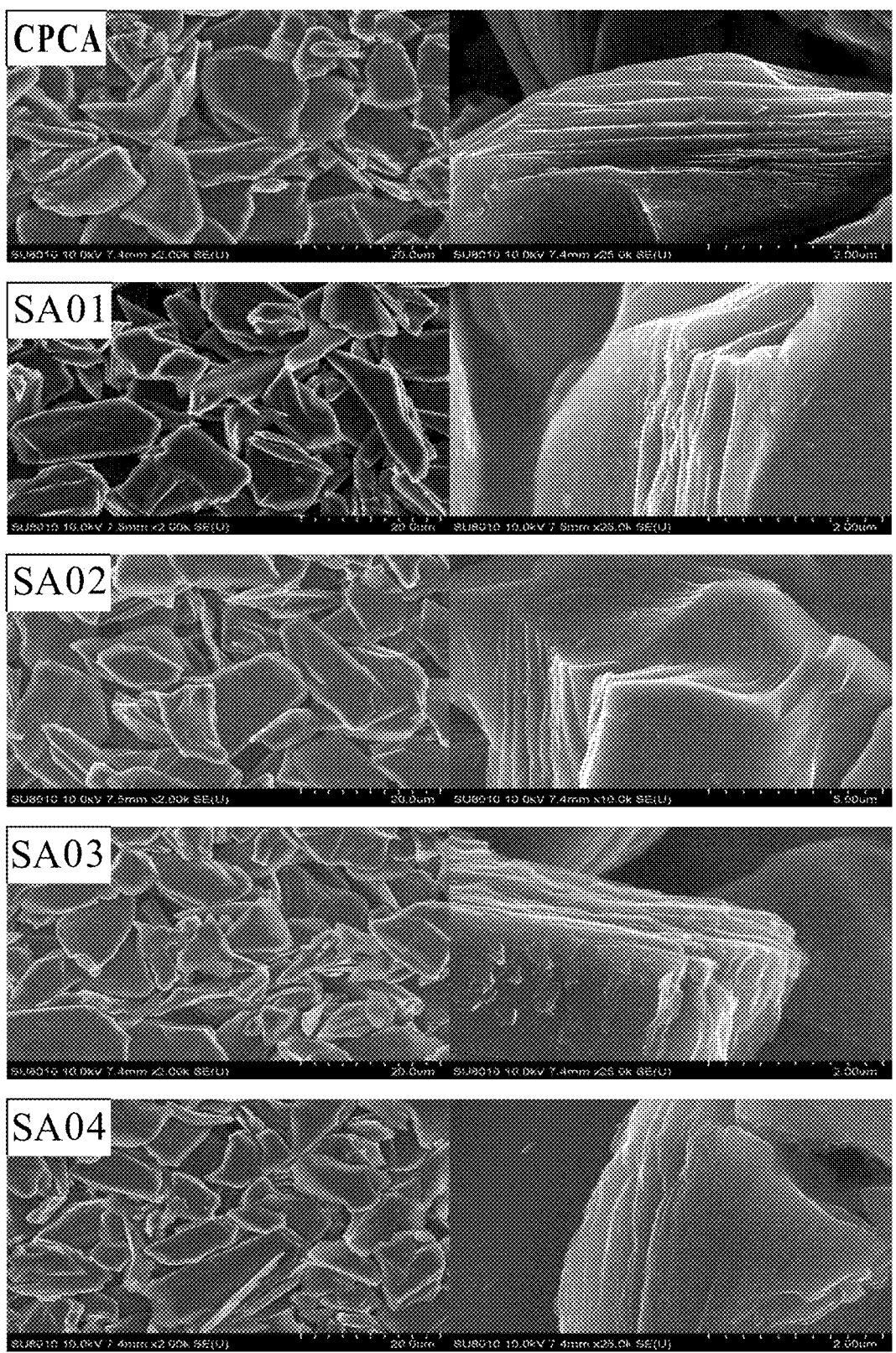
FIG. 4 shows the SEM images of the soft carbon materials of the present disclosure.

FIG. 3 shows $L_c$, $L_a$, and $L_c/d_{002}$ of the graphite-like crystallites within all initial soft carbons. Table 1 shows the number of layers and length of c-axis crystal plane (002) of the initial soft carbon materials of different crystalline degrees.

the left image of FIG. 4, at low magnification of 2,000×, the average particle diameter of the five initial soft carbon materials of the present disclosure is 20 µm. As shown in the right image of FIG. 4, at high magnification of 25,000×, the layered structure of graphite is observed, and some defects are found in the lateral graphite layered structure.

Figure 5:
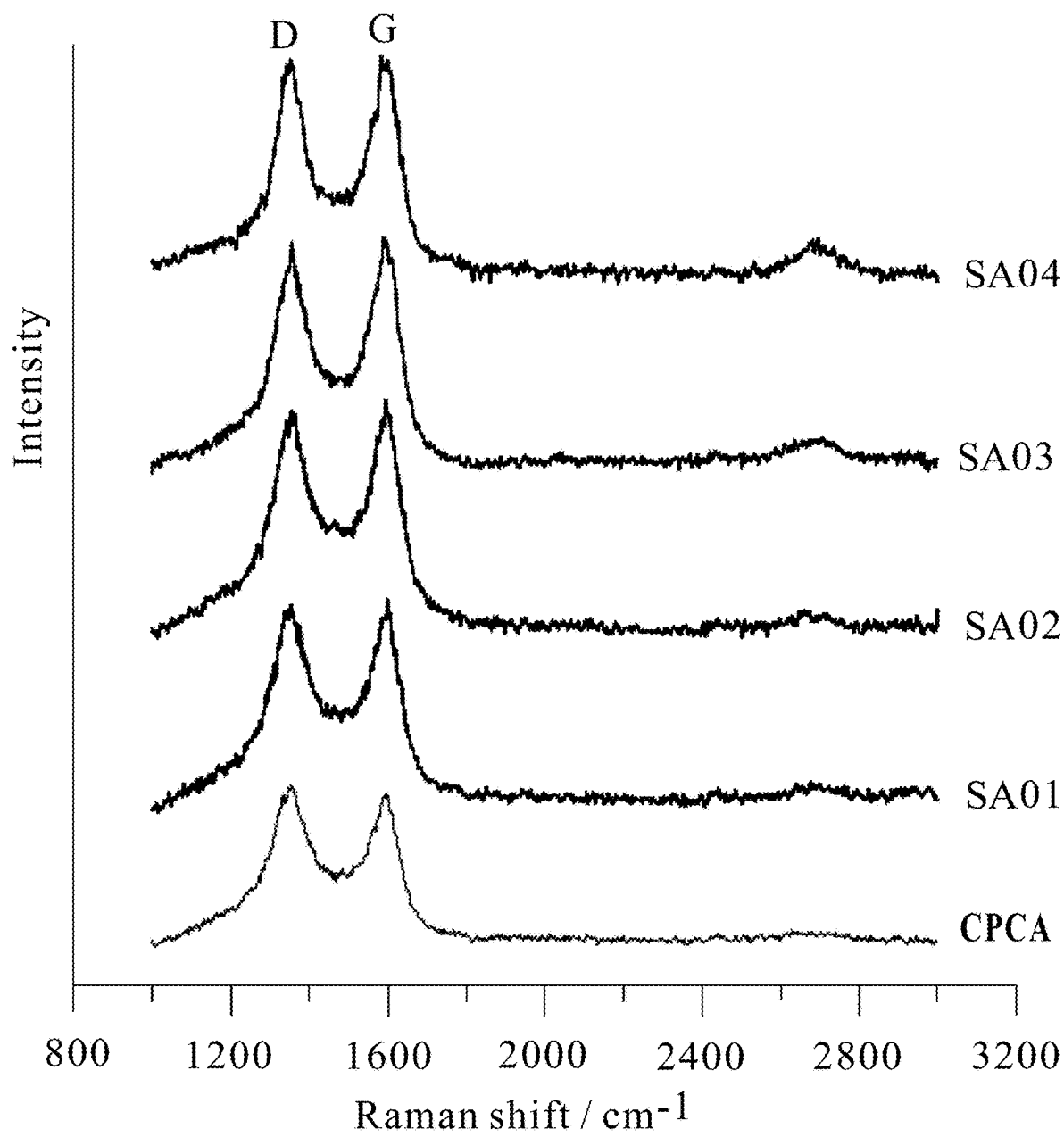
FIG. 5 is Raman spectra of the soft carbon materials of the present disclosure.

FIG. 5 is the Raman spectra of the initial soft carbon materials of the present disclosure. Table 2 shows the intensity ratio ($I_D/I_G$) of D band to G band and $L_a$ dimensional length of the initial soft carbon materials of the present disclosure. As shown in FIG. 5, the Raman spectra test is conducted at a wavelength of 532 nm with an oscillation wave number of 1000-3000 cm$^{-1}$. The D band represents the ring breathing vibration mode of sp2 hybridized carbon atom ring in graphite crystallites, showing disorder and defects of a graphite-like lattice. In the Raman spectra of graphite crystallites, the G band is generally at 1587 cm$^{-1}$ and represents the intra-plane vibration mode of sp2 hybridized carbon atoms in the graphite-like crystallites.

As shown in Table 2, the defect degree of a graphite structure can be obtained in accordance with the intensity ratio ($I_D/I_G$) of the two peaks. According to the present disclosure, there is only little difference in the structural defects among the five initial soft carbon materials with

TABLE 1

| initial soft carbon material | THETA (θ) (°) | full-width at half maximum (FWHM) (°) | THETA (θ) (rad.) | full-width at half maximum (FWHM) (rad.) | carbon layer spacing d (Å) | $L_c$ (Å) | average number of graphite crystallite layers or graphite-like crystallite layers |
|---|---|---|---|---|---|---|---|
| CPCA | 12.72 | 4.3250 | 0.2220 | 0.0755 | 3.498 | 18.364 | 5.25 |
| SA01 | 12.68 | 3.5520 | 0.2213 | 0.0620 | 3.509 | 22.362 | 6.37 |
| SA02 | 12.60 | 2.7720 | 0.2199 | 0.0484 | 3.531 | 28.646 | 8.11 |
| SA03 | 12.67 | 2.0160 | 0.2212 | 0.0352 | 3.511 | 39.389 | 11.22 |
| SA04 | 12.70 | 1.5240 | 0.2217 | 0.0266 | 3.503 | 52.123 | 14.88 |
| CPCB | 13.15 | 0.3047 | 0.2295 | 0.0053 | 3.369 | 278.500 | 82.66 |

As shown in FIG. 3 and Table 1, according to the present disclosure, the initial soft carbon materials (CPCA, SA01~SA04) are of the first carbon layer spacing (carbon layer gap) equal to 3.498 Å~3.531 Å, i.e., greater than 0.345 nm but less than 0.360 nm, whereas the graphite (CPCB) is of a carbon layer spacing of 3.369 Å, i.e., less than 0.345 nm.

The length of $L_c$ crystallites (domain) is becoming greater, as confirmed with Scherrer's equation: $L_c = 0.89\lambda/\beta c \cos \theta c$. According to the present disclosure, the initial soft carbon material (CPCA) has the shortest length (18.364 Å) of c-axis graphite-like crystallites, whereas the initial soft carbon material (SA04) has the greatest length (52.123 Å) of c-axis graphite-like crystallites, wherein both are less than 6 nm (60 Å) in length. By contrast, graphite (CPCB) has a c-axis graphite crystallite length of 278.5 Å, i.e., greater than 6 nm.

The ratio of the c-axis length ($L_c$, also known as the crystal plane (002) length) to the carbon layer spacing $d_{002}$, that is, $L_c/d_{002}$, is calculated to obtain the average number of graphene layers (or domain thickness). According to the present disclosure, the average number of graphite-like crystallite layers of the initial soft carbon materials (SA04, SA01~SA04) ranges from 5.25 to 14.88. By contrast, the average number of graphite crystallite layers of the graphite (CPCB) is 82.66. The average number of graphite crystallite layers affects current characteristics of ion injection and is described later.

Referring to FIG. 4, it shows the SEM images of the initial soft carbon materials of the present disclosure. As shown in different crystal sizes, i.e., their $I_D/I_G$ ratio is around 1; thus, this confirms that there is no significant correlation between the microstructure and the defect degree of the initial soft carbon materials. By contrast, the graphite has an $I_D/I_G$ ratio of 0.029 and thus the defect degree is much lower and much more ordering in comparison with all initial soft carbons. The $L_a$ dimensional length of the five initial soft carbon materials with different crystal sizes is obtained with the equations $C(\lambda) = -126 \text{ Å} + 0.033\lambda$ and $L_a = C(\lambda)/(I_D/I_G)$, where $C(\lambda)$ denotes a wavelength dependent factor. According to the present disclosure, the $L_a$ dimensional length of the initial soft carbon materials (i.e., the crystal plane (101) length) is around 50 Å, which is less than 6 nm. By contrast, the $L_a$ dimensional length of the graphite is 1708.96 Å, which is much greater than 6 nm.

TABLE 2

| initial soft carbon material | $I_D/I_G$ | $L_a$(Å) |
|---|---|---|
| CPCA | 0.988 | 50.16 |
| SA01 | 0.981 | 50.51 |
| SA02 | 0.959 | 51.68 |
| SA03 | 0.977 | 50.73 |
| SA04 | 1.050 | 47.20 |
| CPCB (graphite) | 0.029 | 1708.96 |

Table 3 shows the results of a test on the BET specific surface area of the initial soft carbon materials of different crystal sizes according to the present disclosure. The BET specific surface area test entails the BET specific surface area of all initial soft carbon materials determined with the nitrogen gas adsorption and desorption isotherms, where the weight of the respective initial soft carbon materials is around 0.3 g. As shown in Table 3, porosity of each initial soft carbon material is low, with specific surface area of just around 1 $m^2/g$, indicating that all the initial soft carbon materials are carbonized to a certain extent.

TABLE 3

| | CPCA | SA01 | SA02 | SAO3 | SA04 |
|---|---|---|---|---|---|
| BET specific surface area | 1.6283 $m^2/g$ | 1.3953 $m^2/g$ | 1.2438 $m^2/g$ | 1.4311 $m^2/g$ | 1.2280 $m^2/g$ |

S2: Alkaline Activation

The alkaline activation in an embodiment of the present disclosure is discussed below. An alkaline activation is performed on the respective initial soft carbon material with an alkaline activator to obtain a first processing carbon material. Referring to FIG. 6, it shows a flowchart of the alkaline activation step in an embodiment of the present disclosure. As shown in FIG. 6, the alkaline activation step S2 comprises steps S21-S27, which are described below.

Step S21: ingot KOH, which serves as the alkaline activator, and the initial soft carbon material are placed in a mortar in a ratio of 4:1. The alkaline activator is at least one selected from the group consisting of alkali metal hydroxides (for example, NaOH), alkali metal carbonates (for example, sodium carbonate and potassium carbonate) and alkali metal hydrogen carbonates (for example, sodium hydrogen carbonate and potassium hydrogen carbonate). The ratio of alkali activator to the initial soft carbon material is not particularly limited, and can be appropriately selected according to the purpose. In this regard, the weight of the alkaline activator is preferably greater than the weight of the initial soft carbon material.

Step S22: the ingot KOH and the initial soft carbon material are mixed in the mortar as thoroughly as possible until the ingot KOH particles become invisible.

Step S23: the mixture particles are gathered and put in a cubic aluminum oxide vessel, its upper lid is covered, and the vessel is placed in a horizontal-pipe-atmosphere high-temperature furnace, where high-temperature pipes are stainless steel pipes.

Step S24: nitrogen gas is introduced into the high-temperature furnace and heated at a temperature rising speed of 3° C./min until the temperature increases to 800° C., the temperature is kept at 800° C. for two hours, and then the temperature is decreased to room temperature.

Step S25: the alkaline-activated soft carbon material is gathered with deionized water, around 1.5 L of water is added thereto, the mixture is heated and stirred for one hour, so as to remove impurities.

Step S26: the initial soft carbon materials, which has been processed to remove impurities in step S25, is gathered with an air-extracting filtration device, and then go back to step S25.

Step S27: the initial soft carbon material gathered in step S26 is used as a sample, placed on a filter paper, placed with the filter paper in a vacuum oven, and then baked at 80° C. for 24 hours for removing all the water content so as to obtain the first processing carbon material.

Then, the material analysis is performed on the first processing carbon material. To this end, KOH activation is performed on the initial soft carbon material (SA03), which is a graphite-like crystallite, to form the first processing carbon material.

Figure 7:
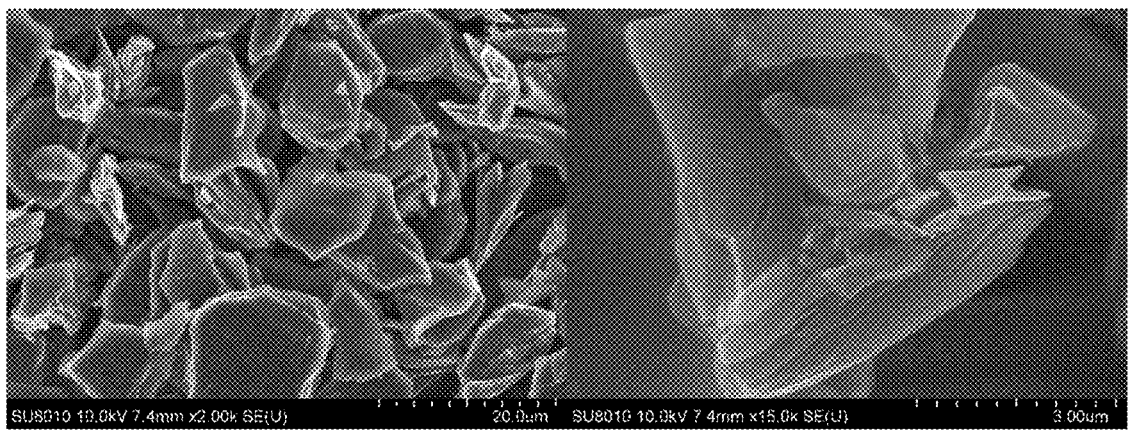
FIG. 7 shows the SEM images of the initial soft carbon material (SA03) after the alkaline activation according to the present disclosure.

Referring to FIG. 7, it shows the SEM images of the initial soft carbon material (SA03) upon alkaline activation step according to the present disclosure. As shown in the left image of FIG. 7, from a macro perspective and at low magnification of 2,000×, there is no significant difference in particle size between the first processing carbon material and the initial soft carbon material (SA03) shown in FIG. 4. However, the right image of FIG. 7 shows, at high magnification of 15,000×, that the graphite crystallite carbon layer structure upon KOH activation has been destroyed. The destroy of the graphite crystallite carbon layer structure may result from that KOH activation starts from the amorphous part of the graphite crystallite carbon layer structure, and the first processing carbon material is composed of plenty tiny graphite crystalline structures and thus is unlikely to display much changes from a macro perspective.

Figure 8A:
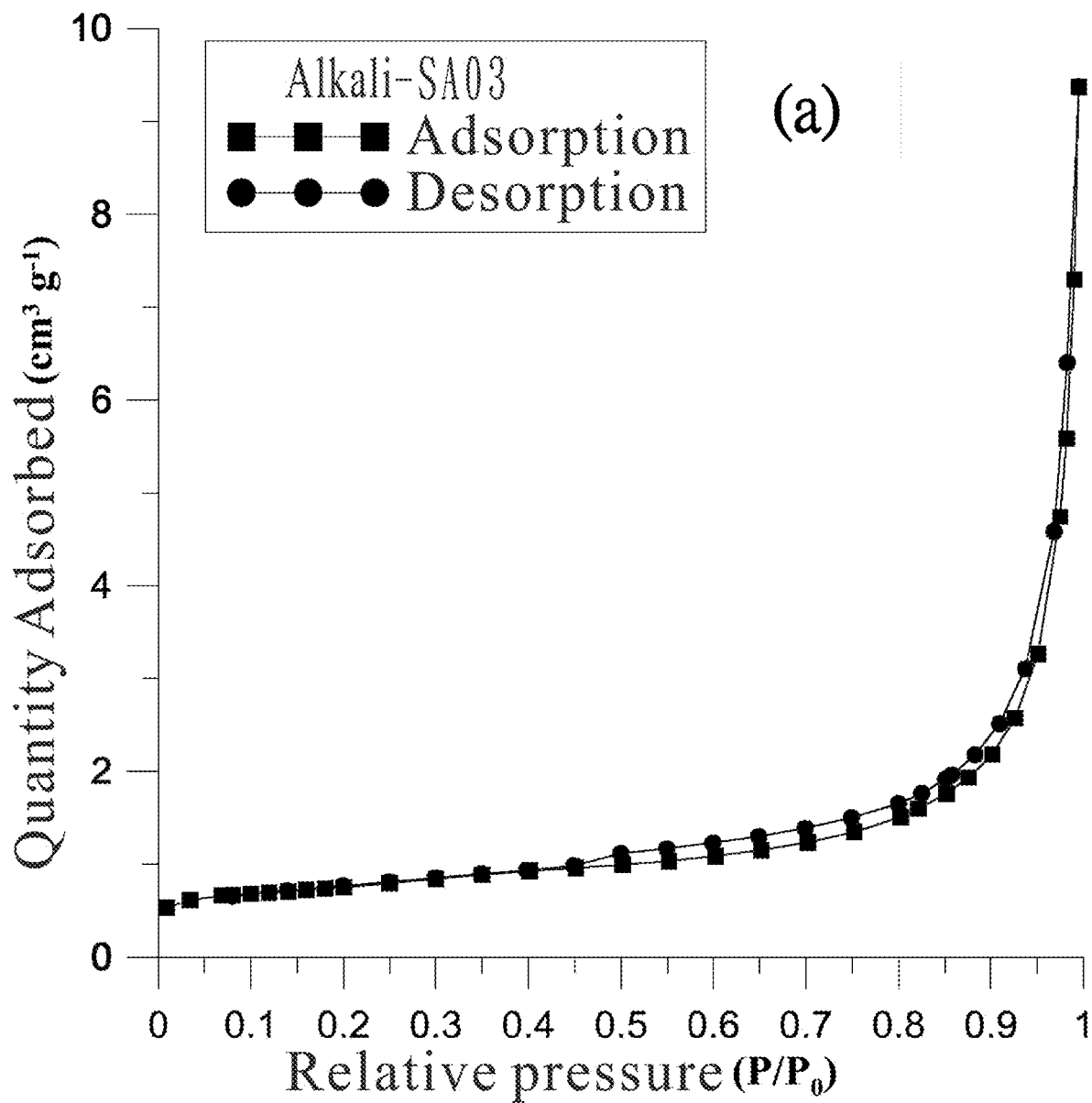
FIG. 8A shows the nitrogen gas adsorption-desorption isotherms charts of the initial soft carbon material (SA03) after the alkaline activation according to the present disclosure.
Figure 8B:
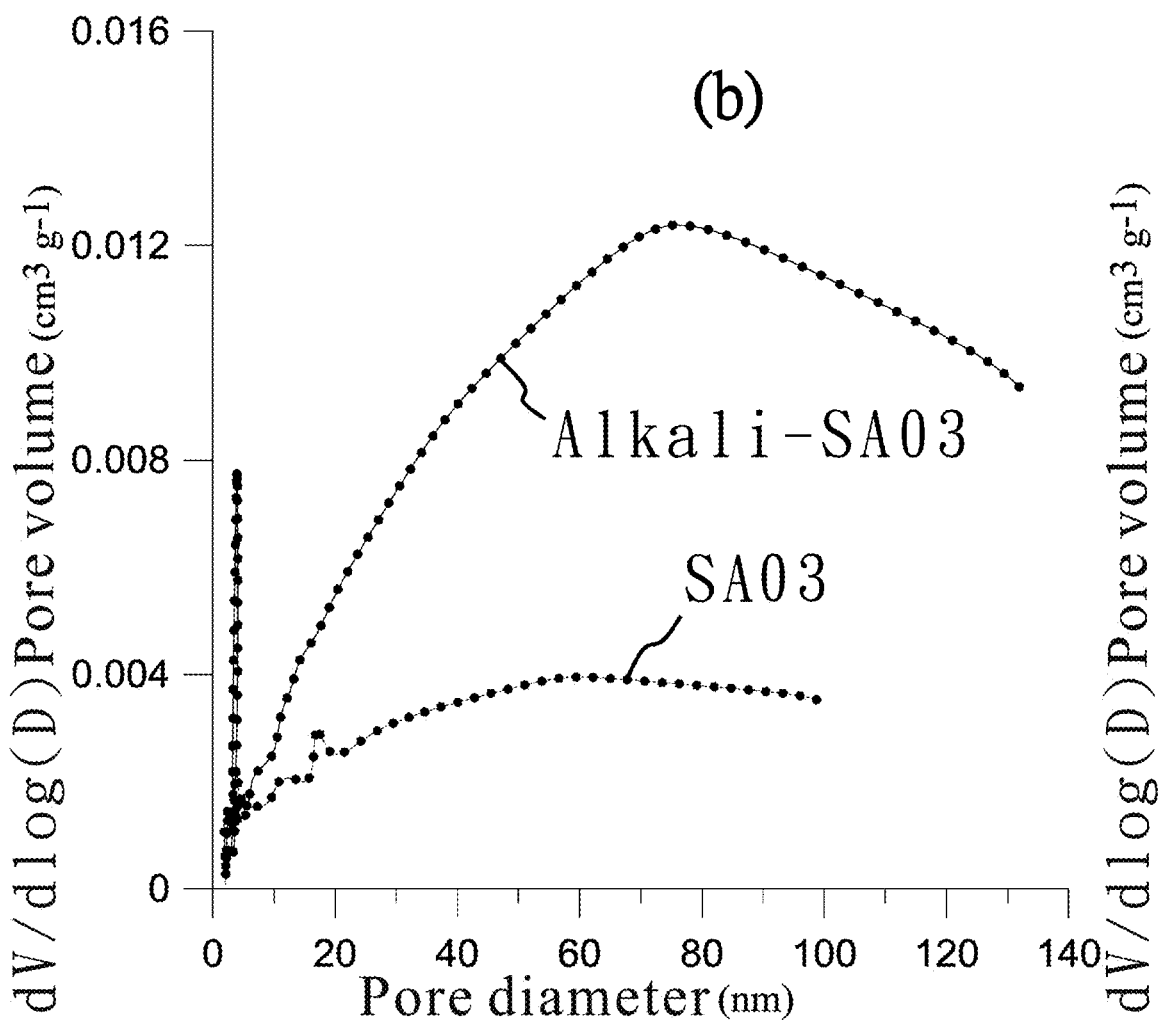
FIG. 8B shows the pore diameter distribution charts of the initial soft carbon material (SA03) after the alkaline activation according to the present disclosure.
Figure 8C:
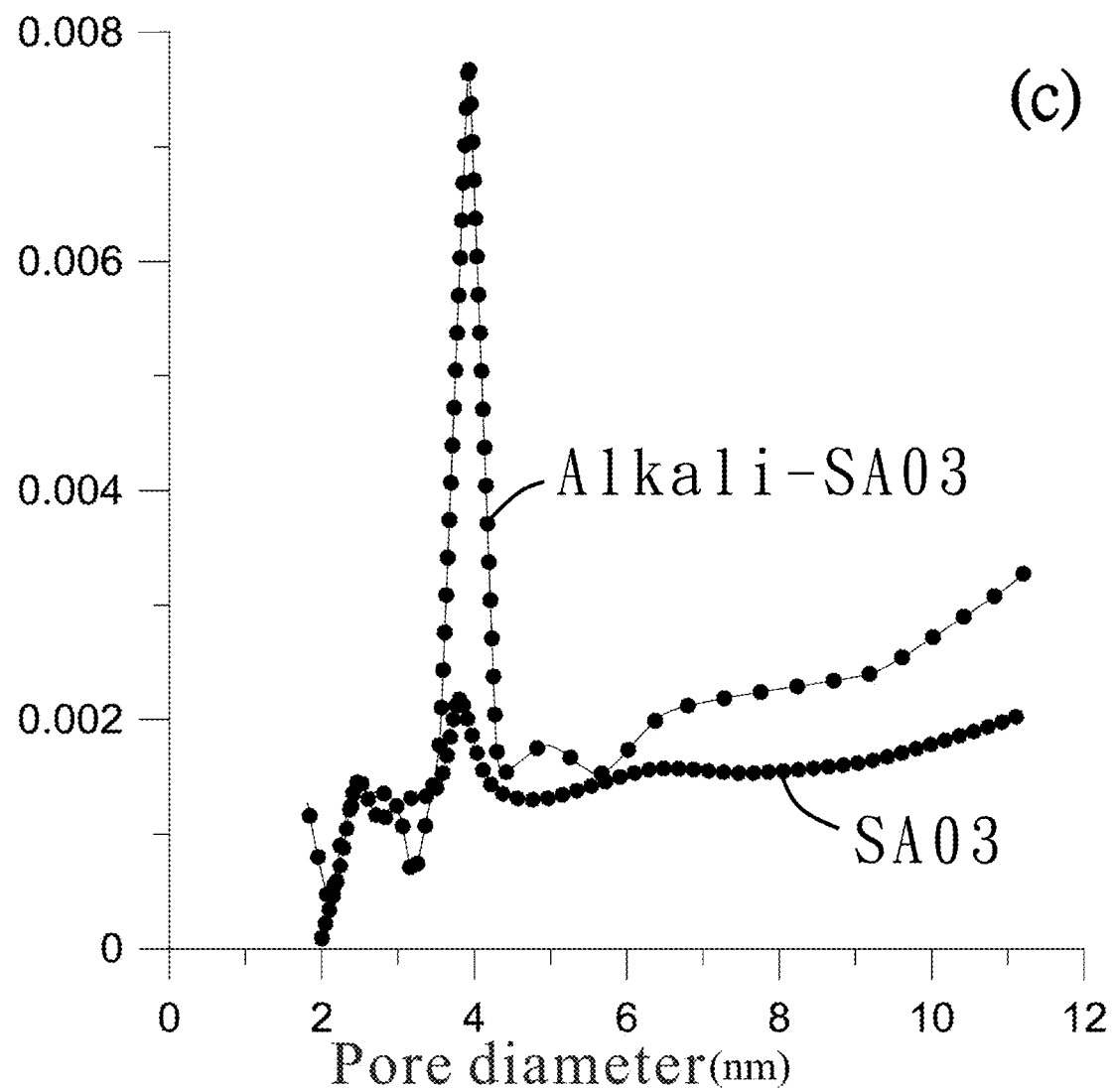
FIG. 8C shows the pore diameter distribution charts of the initial soft carbon material (SA03) after the alkaline activation according to the present disclosure.

Referring to FIG. 8A to 8C, it shows a nitrogen gas adsorption and desorption isotherm and pore diameter distribution charts of the initial soft carbon material (SA03) upon the alkaline activation step according to the present disclosure. As shown in FIG. 8A, after the initial soft carbon material (SA03) is activated by KOH, the amount of adsorption and desorption is almost the same, and thus the first processing carbon material from the initial soft carbon material (SA03) still displays a Type III pore-free structure. As shown in pore diameter distribution charts of FIG. 8B and FIG. 8C, after the alkaline activation is performed on the initial soft carbon material (SA03), mesopores of the initial soft carbon material (SA03) are slightly increased, whereas macropores and micropores are significantly increased.

Changes caused by the alkaline activation to the initial soft carbon material (SA03) are described below. Table 4 shows the BET specific surface areas of the initial soft carbon material (SA03) and the alkali-processed (Alkali)-SA03 and their average pore diameters, respectively.

TABLE 4

| type | BET specific surface area ($m^2/g$) | average pore diameter (nm) |
|---|---|---|
| SA03 | 1.4311 | 17.6217 |
| alkali-processed-SA03 | 2.5540 | 22.5218 |

As shown in Table 4, upon the KOH chemical activation, specific surface area of the alkali-processed soft carbon material (SA03) increases from 1.4311 $m^2/g$ to 2.5540 $m^2/g$, and the increase is insignificant. By contrast, the conventional method of preparing chemically activated carbon involves using amorphous carbon materials as KOH activation precursor, thereby increasing the specific surface area to 1000 $m^2/g$, 2000 $m^2/g$, or even greater. This phenomenon also happens to the average pore diameter. Upon the KOH chemical activation, the average pore diameter of the alkali-processed soft carbon material (SA03) increases from 17.6217 nm to 22.5218 nm, and the increase is insignificant. It is because the reaction between amorphous carbons and KOH is so vigorous that pores can be formed by etching as soon as the amorphous carbons and KOH come into contact with each other. However, the initial soft carbon material has tiny graphite crystalline structures conducive to inhibit the KOH etching; thus, the specific surface area and average pore diameter do not increase significantly. In a preferred embodiment, the first processing carbon material has a specific surface area of less than 5 m²/g and an average pore diameter of less than 40 nm, and thus the initial soft carbon material is suitable for the high-voltage supercapacitors.

S3: Electrochemical Activation

In an embodiment of the present disclosure, the step of an electrochemical activation (S3) performs an electrochemical activation (EA) on the first processing carbon material with an electrolyte to obtain a soft carbon material for the high-voltage supercapacitors. In a preferred embodiment, the electrochemical activation (EA) step includes cyclic voltammetric scans and a constant current charging and discharging cycle. The cyclic voltammetric scan is performed on the first processing carbon material at 25 mV/s in a potential of −0.6~2.2 V (vs. Ag/AgNO$_3$) for at least three cycles. In a preferred embodiment, the electrolyte is propylene carbonate containing TEABF$_4$. In a preferred embodiment, the cyclic voltammetric scan is performed on the first processing carbon material at 25 mV/s in a potential of −0.6~1.6 V (vs. Ag/AgNO$_3$) for at least three cycles.

In an embodiment of the present disclosure, in the EA step (S3), the EA is carried out by cyclic voltammetric (CV) or constant current (CC) techniques, such that ion insertion brings about long-lasting channels conducive to entry and exit of ions. In the EA step, the operating potential window of the positive electrode is set to −0.6~2.0 V (vs. Ag/AgNO$_3$) to determine the specific capacitance and electrochemical behavior of the materials. Given the EA potential window of −0.6~2.2 V (vs. Ag/AgNO$_3$) or higher, the cyclic voltammetric or constant current charge-discharge methods are used for activation several times until the charge and discharge efficiencies are stable, then the activation step is completed. After that, specific capacitance and electrochemical behavior of the activated materials are evaluated in a potential window of −0.6~2.0 V (vs. Ag/AgNO$_3$).

When the EA process is carried out by the constant current technique, ion insertion is confirmed by observing the presence of charging and discharging plateaus, and thus a high potential is chosen according to a criterion, i.e., the presence of charging and discharging plateaus. However, it is necessary to avoid applying any too high potentials, otherwise the electrolyte will undergo decomposition or the electrodes will peel off.

Figure 9:
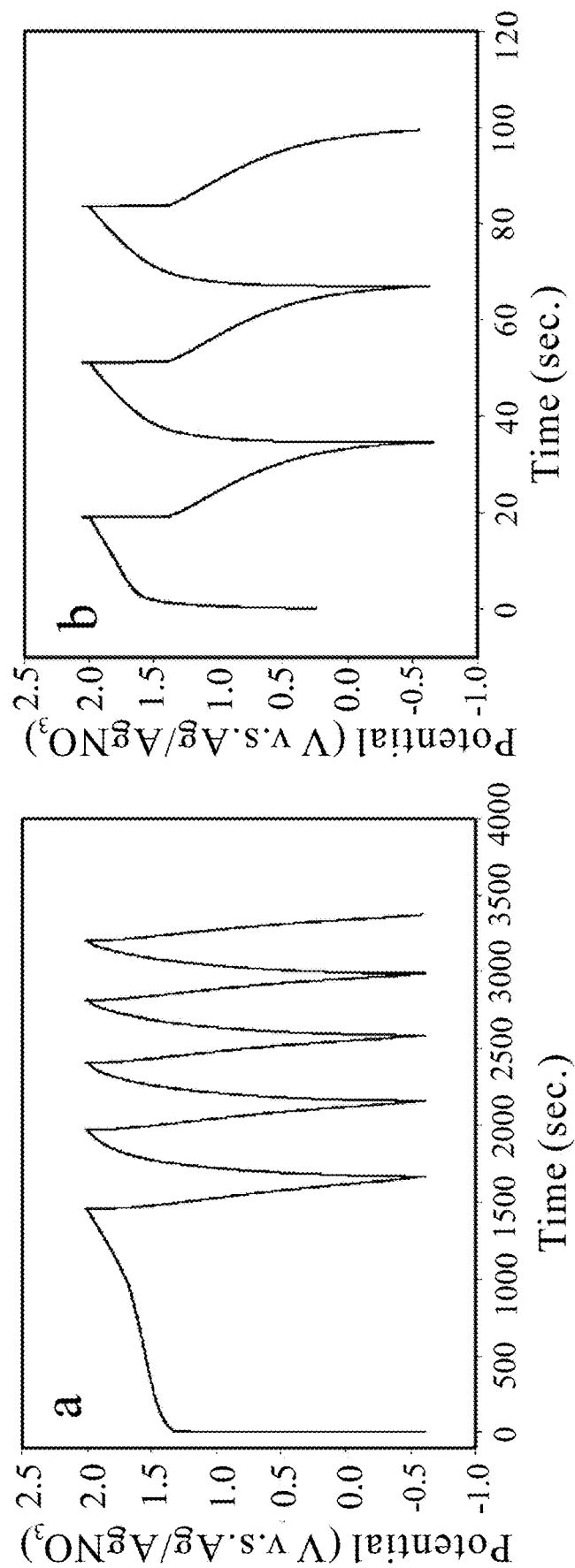
FIG. 9 is a constant current charging and discharging diagram of the initial soft carbon material (SA03), where (a) indicates the results after the alkaline activation step, and (b) indicates those before the alkaline activation step.
Figure 10A:
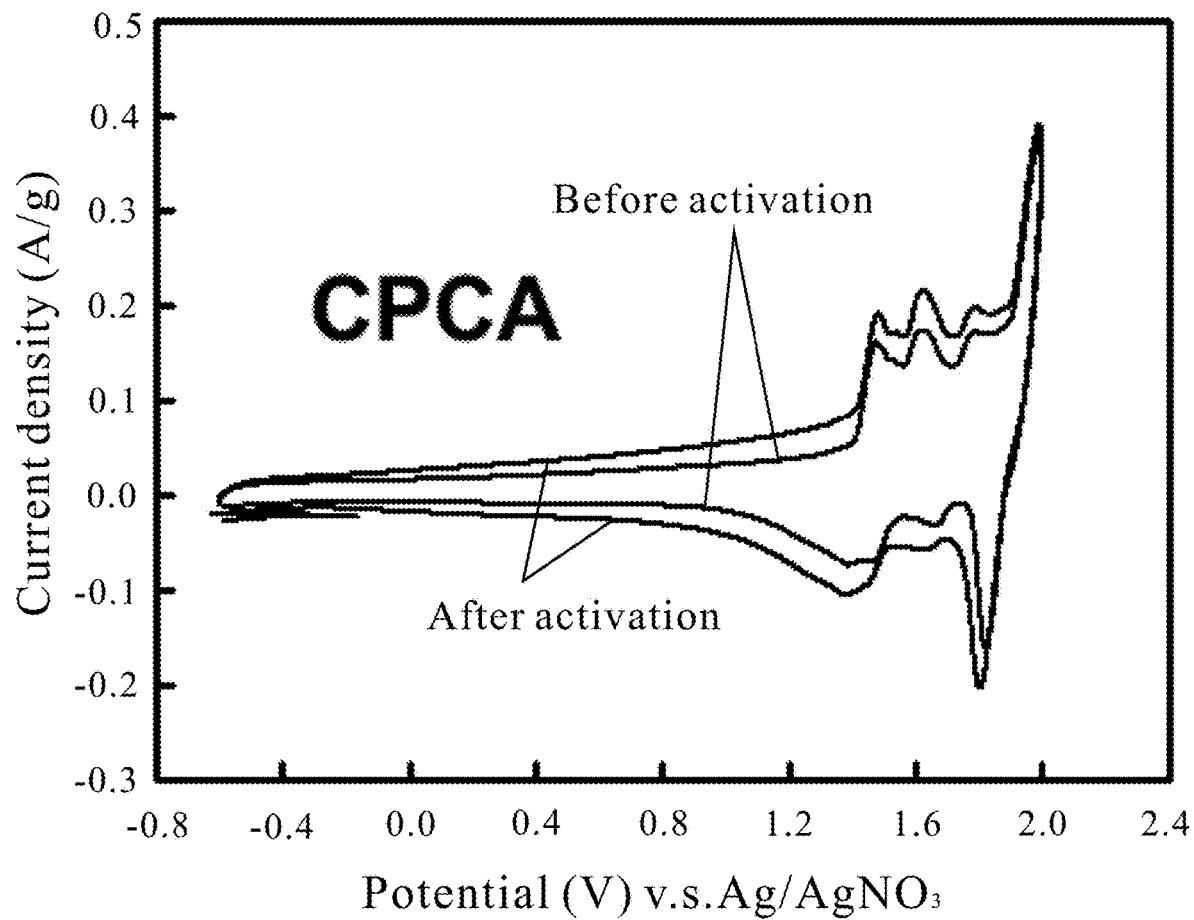
FIG. 10A is the cyclic voltammograms (CVs) illustrative of the initial soft carbon material (CPCA) before and after the electrochemical activation according to the present disclosure.
Figure 10B:
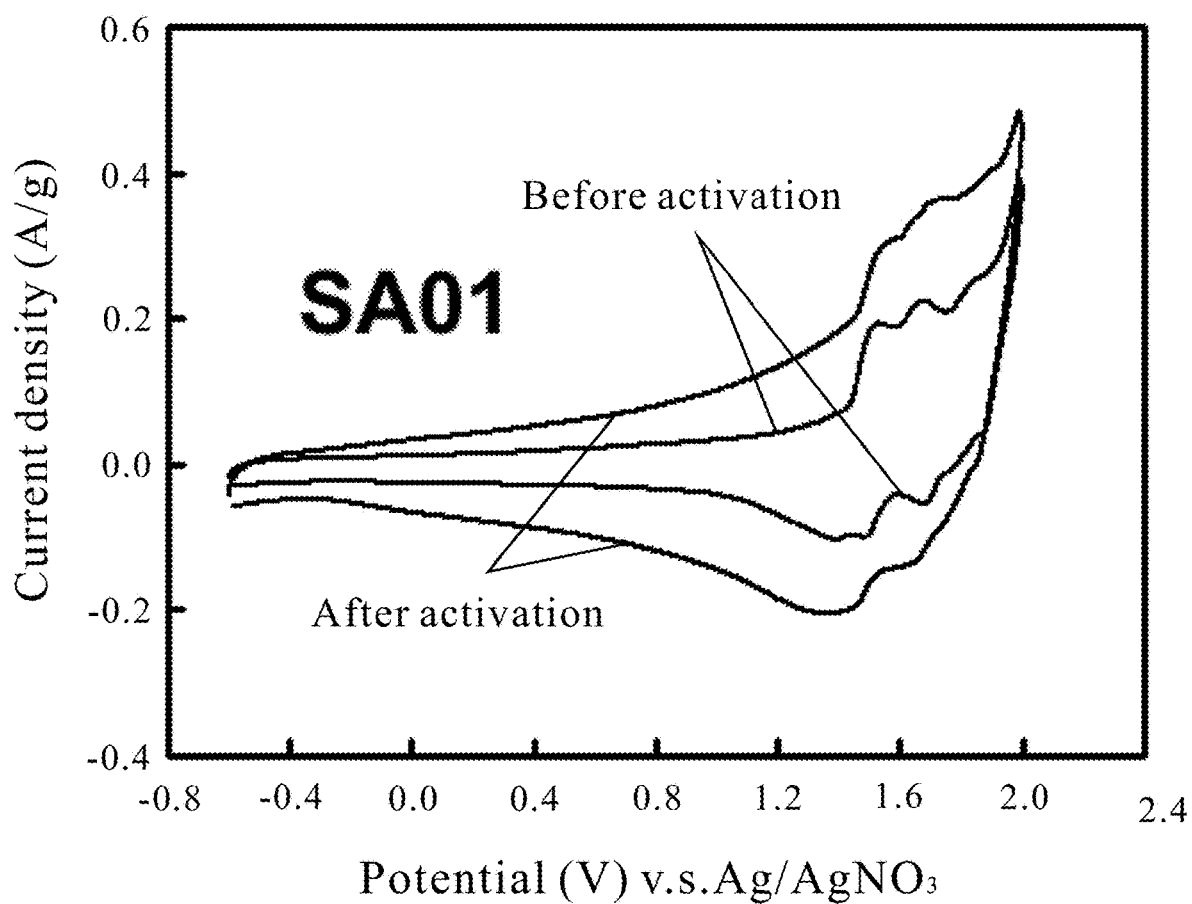
FIG. 10B is the cyclic voltammograms (CVs) illustrative of differences in the initial soft carbon material (SA01) before and after the electrochemical activation according to the present disclosure.
Figure 10C:
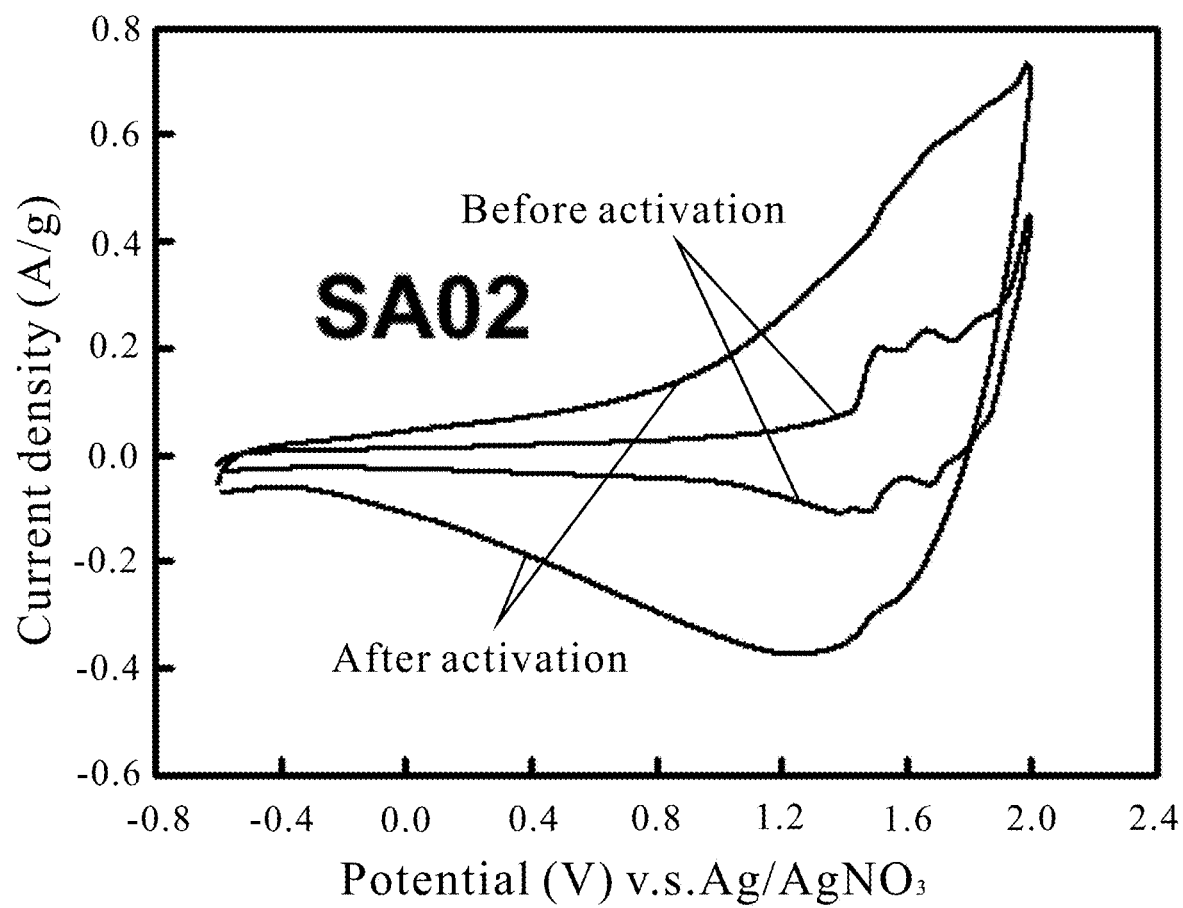
FIG. 10C is the cyclic voltammograms (CVs) illustrative of differences in the initial soft carbon material (SA02) before and after the electrochemical activation according to the present disclosure.
Figure 10D:
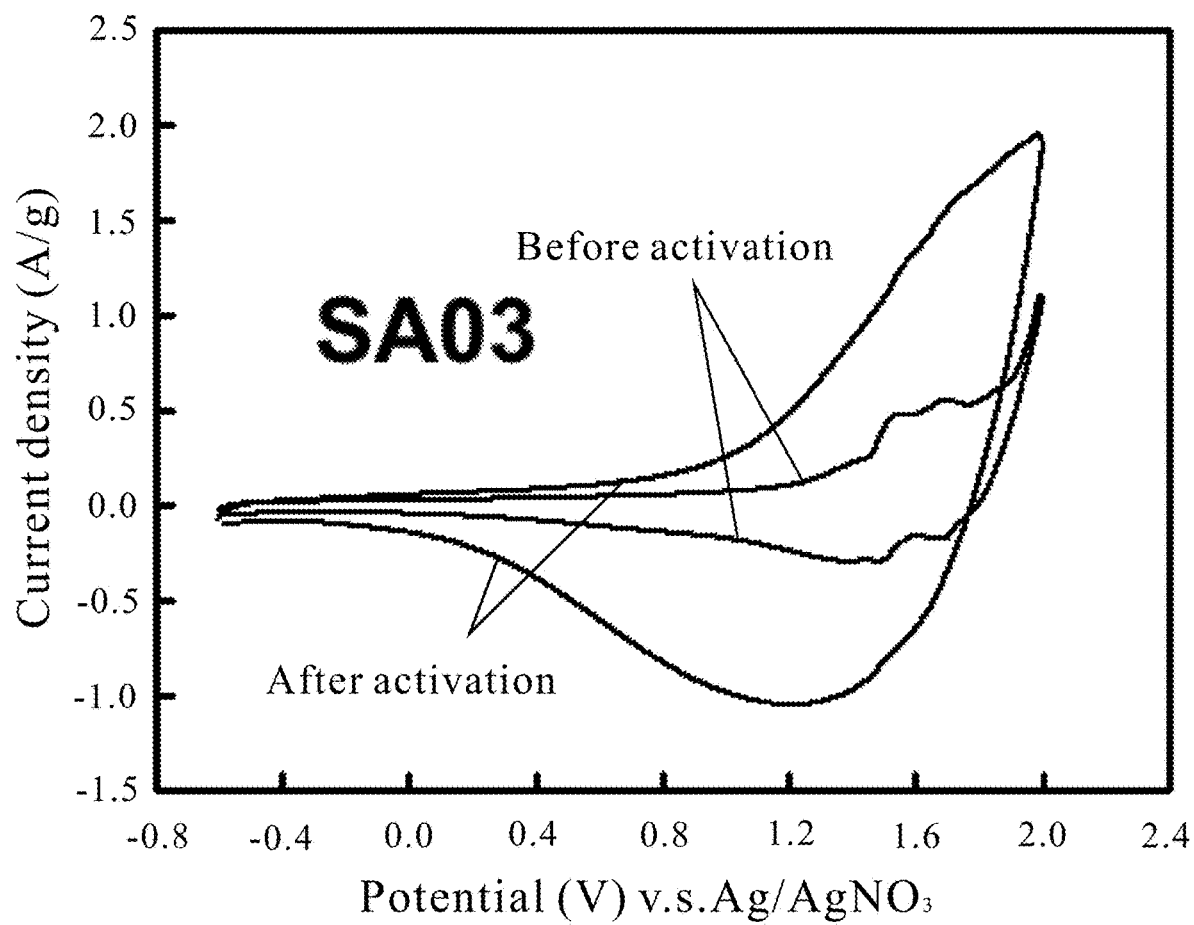
FIG. 10D is the cyclic voltammograms (CVs) illustrative of differences in the initial soft carbon material (SA03) before and after the electrochemical activation according to the present disclosure.
Figure 10E:
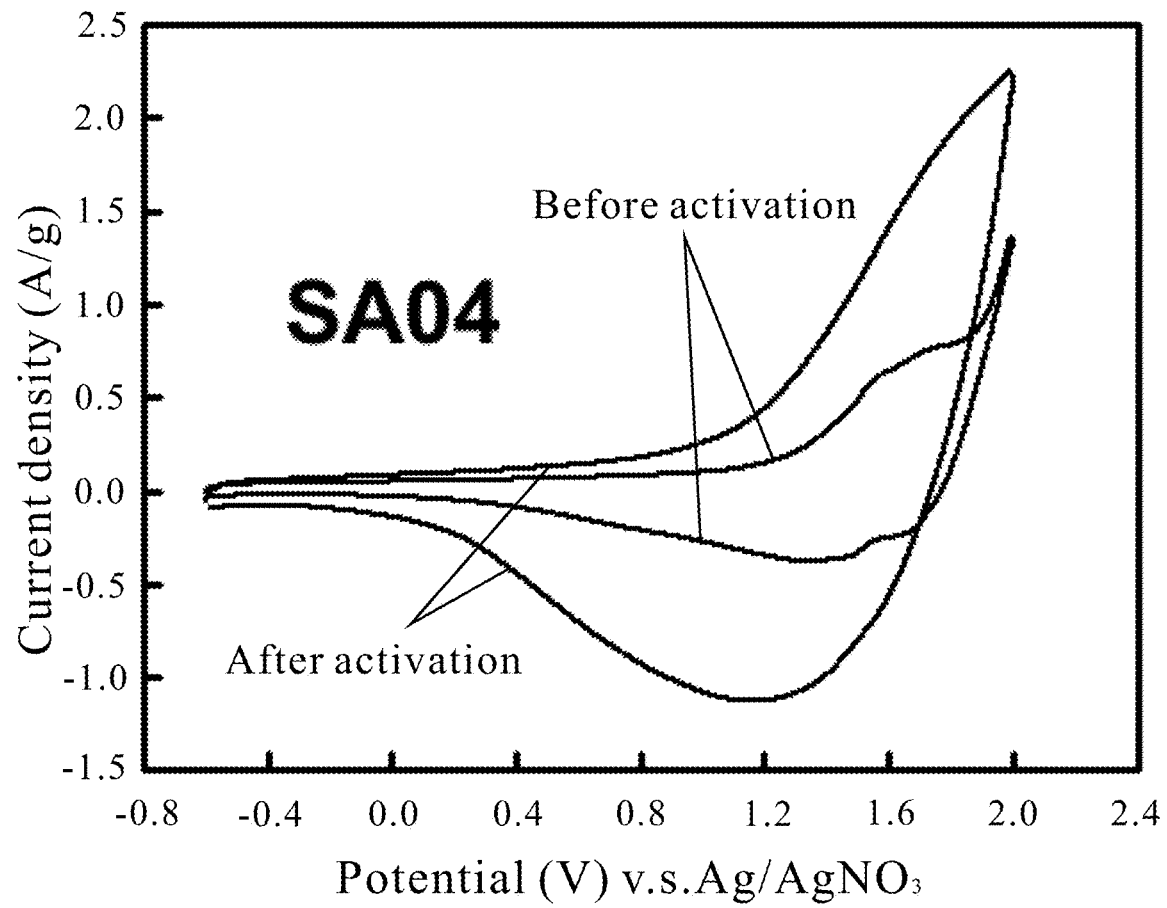
FIG. 10E is the cyclic voltammograms (CVs) illustrative of differences in the initial soft carbon material (SA04) before and after the electrochemical activation according to the present disclosure.

FIG. 9 is a constant current charging and discharging diagram of the initial soft carbon material (SA03), where (a) indicates upon the alkaline activation step, and (b) indicates before the alkaline activation step. In both FIGS. 9(a) and 9(b), the test is conducted at a current density of 1 A/g.

Calculation of the gravity specific capacitance (hereinafter denoted as specific capacitance) of FIGS. 9(a) and 9(b) is described below. As shown in FIG. 9(a), the initial soft carbon material (SA03) upon KOH activation has a specific capacitance of 65.38 F/g. As shown in FIG. 9(b), the initial soft carbon material (SA03) without KOH activation has a low specific capacitance of 6.9 F/g. Therefore, alkaline activation enables the specific capacitance to increase by around 10 times.

There are differences in the features of the charging and discharging curves between FIGS. 9(a) and 9(b). As soon as the first processing carbon material formed from the soft carbon material (SA03) (hereinafter denoted as alkali-processed-SA03) is charged, the potential is immediately increased to around 1.3 V (vs. Ag/AgNO$_3$) since the alkali-processed-SA03 has a low specific surface area (equal to 2.5540 m²/g), which is less than the specific surface area (greater than 1,000 m²/g) of the amorphous alkali-activated carbons. A sharp slope turning point, which is an intercalation onset potential (IOP), appears after the potential is increased to about 1.3 V (vs. Ag/AgNO$_3$). As shown in CVs, ion injection starts with this potential approximately. Then, the gradient inflection point is followed by a flat segment (hereinafter denoted as a plateau) adapted to effect ion injection and form ion intercalation and de-intercalation active sites.

As shown in FIG. 9(a), upon completion of first charge, unlike the charging curve, the discharging curve does not display a plateau of ion injection/ejection but displays a sloping-downward straight line of a typical EDLV on the constant current charging and discharging curves. This is significantly different from the first charging-discharging cycle (each cycle shows a potential plateau of injection and ejection) of the initial soft carbon material (SA03) without KOH activation (see FIG. 9(b)).

After alkali-processed-SA03 has undergone the first charging-discharging cycle, subsequent charging and discharging curves are similar to the typical EDLC behavior, except for the presence of a potential plateau when the potential is greater than 1.5 V (vs. Ag/AgNO$_3$). This indicates that there is still ion injection at high voltages, though each discharge curve is of the typical EDLC behavior. Constant current charging-discharging process requires only one round trip charging and discharging cycle, then the capacitor behavior is very similar to EDLC. However, when cyclic voltammetry (CV) is used to effect the ion injection and activate the materials, more potential scan cycles are required to develop the stable EDLC behavior.

In the EA step (S3), the charging-discharging cycle is performed at a potential higher than the upper potential limit of the operation potential window to attain satisfactory electrochemical performance. Therefore, the upper limit of the operating potential window is set to 2.0 V (vs. Ag/AgNO$_3$), and the upper limit of EA potential is set to 2.2 V (vs. Ag/AgNO$_3$). Several cycles are scanned at 2.2 V (vs. Ag/AgNO$_3$) for the EA. The specific capacitance data before and after EA were obtained from CV with the upper potential limit=2.0 V (vs. Ag/AgNO$_3$) for a comparison purpose.

The EA process is discussed here. Before applying the EA process, the electrode is scanned from the open-circuit potential ($E_{OCP}$) to 2.0 V (vs. Ag/AgNO$_3$) for three cycles at a scan rate of 25 mV/s to obtain the original specific capacitance. In the second step, this electrode is scanned from $E_{OCP}$ to 2.2 V (vs. Ag/AgNO$_3$) for three cycles at a scan rate of 25 mV/s to conduct the EA step. In the third step (i.e., after EA), the same electrode is scanned from $E_{OCP}$ to 2.0 V (vs. Ag/AgNO$_3$) for three cycles at a scan rate of 25 mV/s to obtain the specific capacitance of electrochemically activated carbons.

Referring to FIG. 10A to 10E, it shows a comparison of the cyclic voltammograms (CVs) at 25 mV/s for the initial soft carbon materials (without alkaline activation) before and after EA according to the present disclosure. The CV depicts a positive scan from the lower potential limit to the upper potential limit and a negative scan from the upper potential limit to the lower potential limit. As shown in FIG. 10A to 10E, according to the present disclosure, the five initial soft carbon materials (CPCA, SA01~SA04) with different crystalline sizes display different CV curve features prior to EA, but display a very low EDLC current in the potential window of −0.6~1.2 V (vs. Ag/AgNO$_3$), which may result from their low specific surface area.

Referring to FIG. 10A to 10E, when the potential of the respective initial soft carbon material increases to around 1.5 V (vs. Ag/AgNO$_3$), a peak is visible, which is a feature of ion injection. As shown in Table 1, since the initial soft carbon material (CPCA) is the carbon material with the least number of graphene crystalline layers, its ion injection peak is the most obvious, followed by the initial soft carbon material (SA01), the initial soft carbon material (SA02), the initial soft carbon material (SA03), and the initial soft carbon material (SA04) in order.

The effect of the EA step is described below. After being subjected to a high potential (for example, greater than 1.5 V (vs. Ag/AgNO$_3$)), the initial soft carbon material (CPCA) has the least increase in current, followed by the initial soft carbon material (SA01), and the initial soft carbon material (SA02), the initial soft carbon material (SA03) and the initial soft carbon material (SA04). Among all initial soft carbon materials, the initial soft carbon material (SA02) demonstrates a greatest current increase in the potential window of −0.6~1.2 V (vs. Ag/AgNO$_3$) after the EA step. The CV curves are used for calculating the specific capacitance according to this equation: specific capacitance (F/g)=Q/mΔV, where Q denotes the charge in coulombs (C) (obtained by integrating the current-potential curve), ΔV denotes the potential difference in the scanning potential interval in volts (V), and m denotes the mass of the electrode in gram (g) and converted into Table 5, which clearly illustrates the effect of EA. The results shown in Table 5 are summarized as follows: the variation in the specific capacitance (F/g) of the initial soft carbon material (CPCA) is the least, i.e., an increase of 42.13%, but the variation in the specific capacitance (F/g) of the initial soft carbon material (SA02) is the greatest, i.e., an increase of 241.84%. The aforesaid results are consistent with the CVs shown in FIG. 10A to 10E.

TABLE 5

| initial soft carbon material | specific capacitance (F/g) | percentage of increase (%) |
|---|---|---|
| CPCA before EA | 1.695160 | 42.13 |
| CPCA after EA | 2.409300 | |
| SA01 before EA | 2.273626 | 107.28 |
| SA01 after EA | 4.712685 | |
| SA02 before EA | 2.483148 | 241.84 |
| SA02 after EA | 8.488407 | |
| SA03 before EA | 6.240884 | 222.96 |
| SA03 after EA | 20.155770 | |
| SA04 before EA | 8.524246 | 159.75 |
| SA04 after EA | 22.056490 | |

Figure 11:
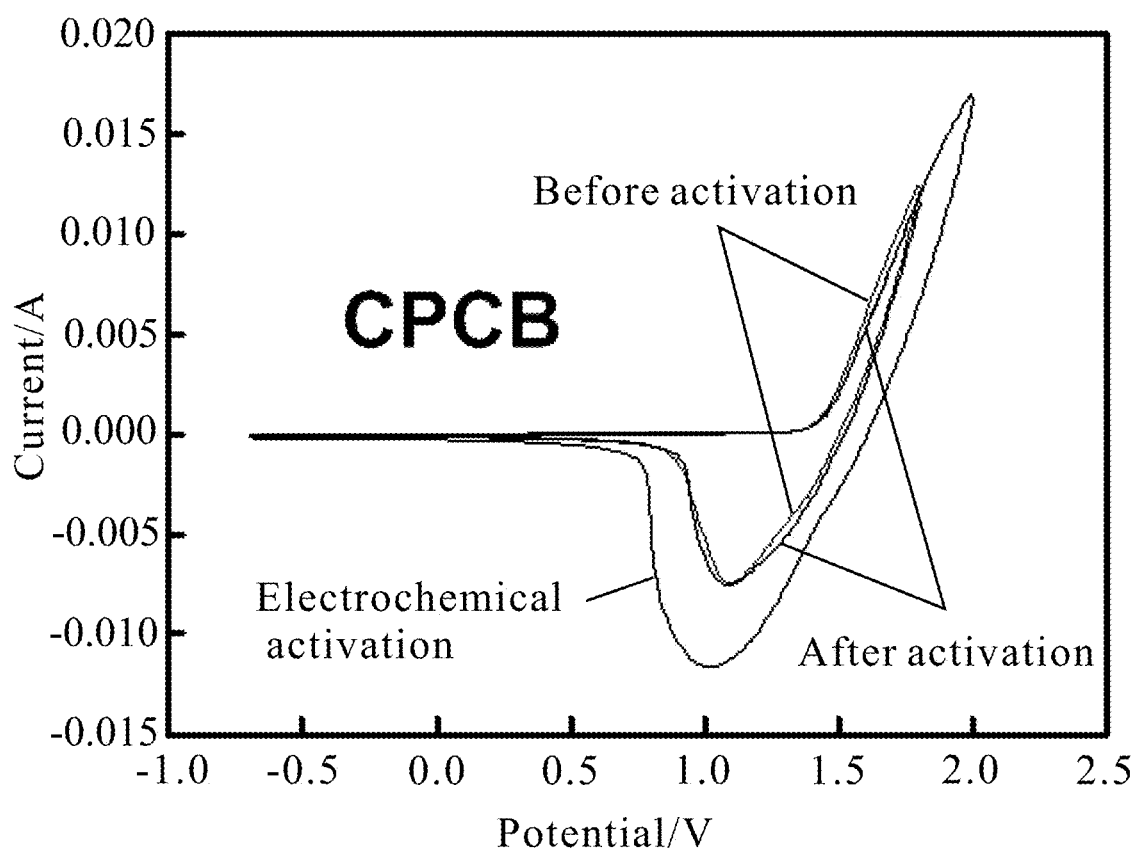
FIG. 11 is the cyclic voltammograms (CVs) illustrative of differences in graphite before and after the electrochemical activation according to the present disclosure.
Figure 12A:
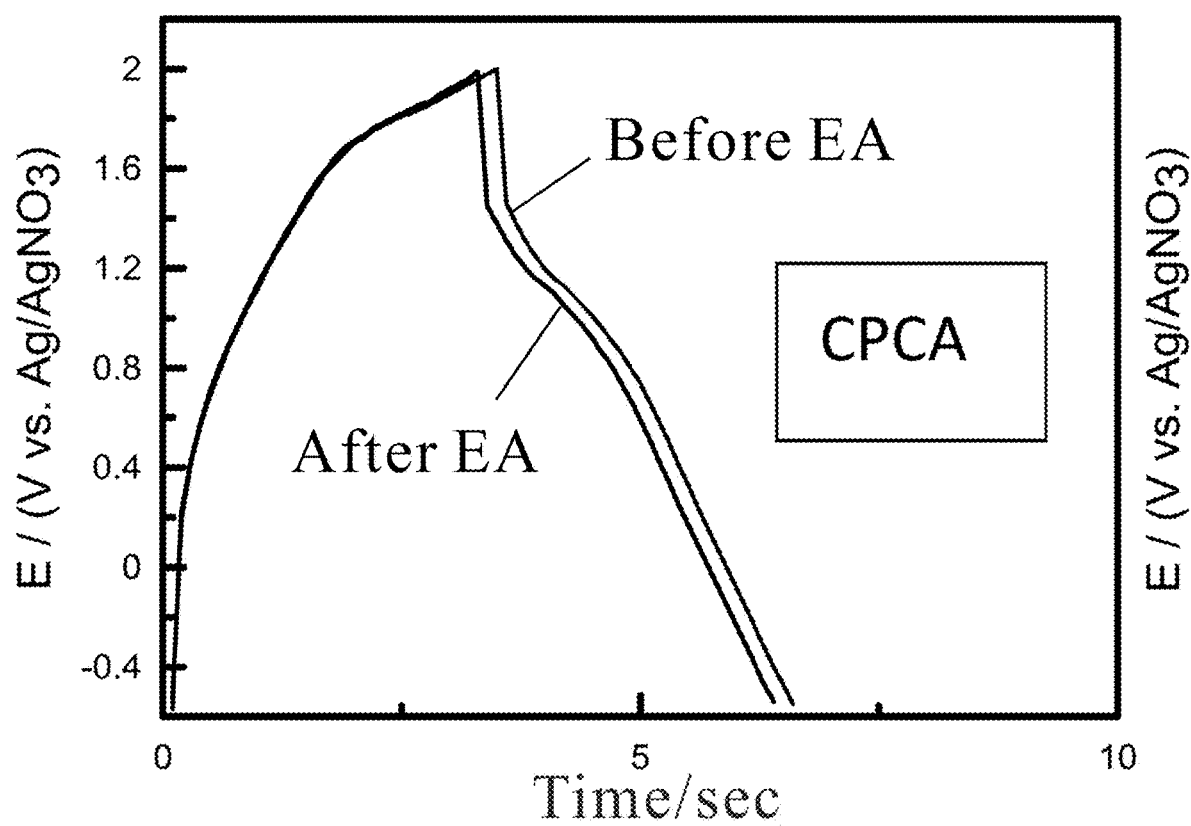
FIG. 12A is a constant current charging and discharging diagram illustrative of the initial soft carbon material (CPCA) before and after the electrochemical activation according to the present disclosure.
Figure 12B:
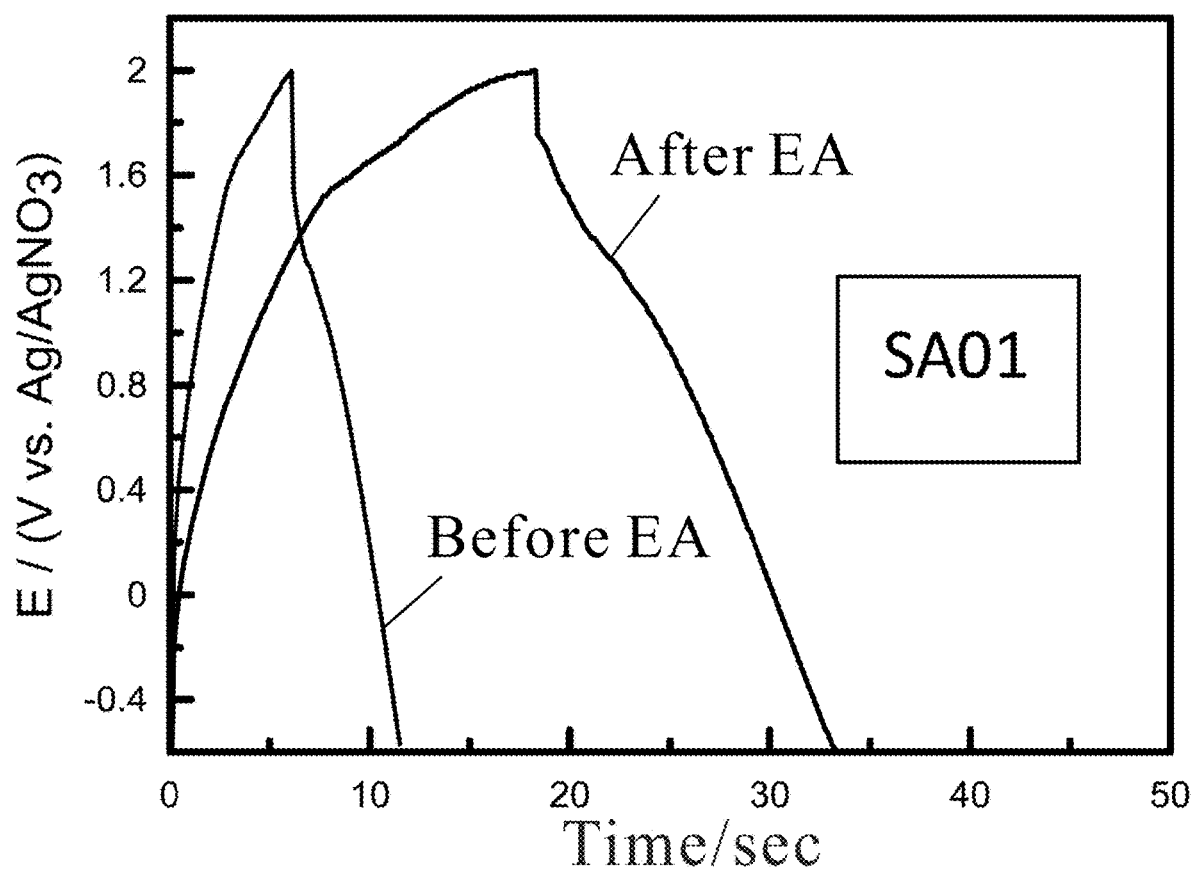
FIG. 12B is a constant current charging and discharging diagram illustrative of the initial soft carbon material (SA01) before and after the electrochemical activation according to the present disclosure.
Figure 12C:
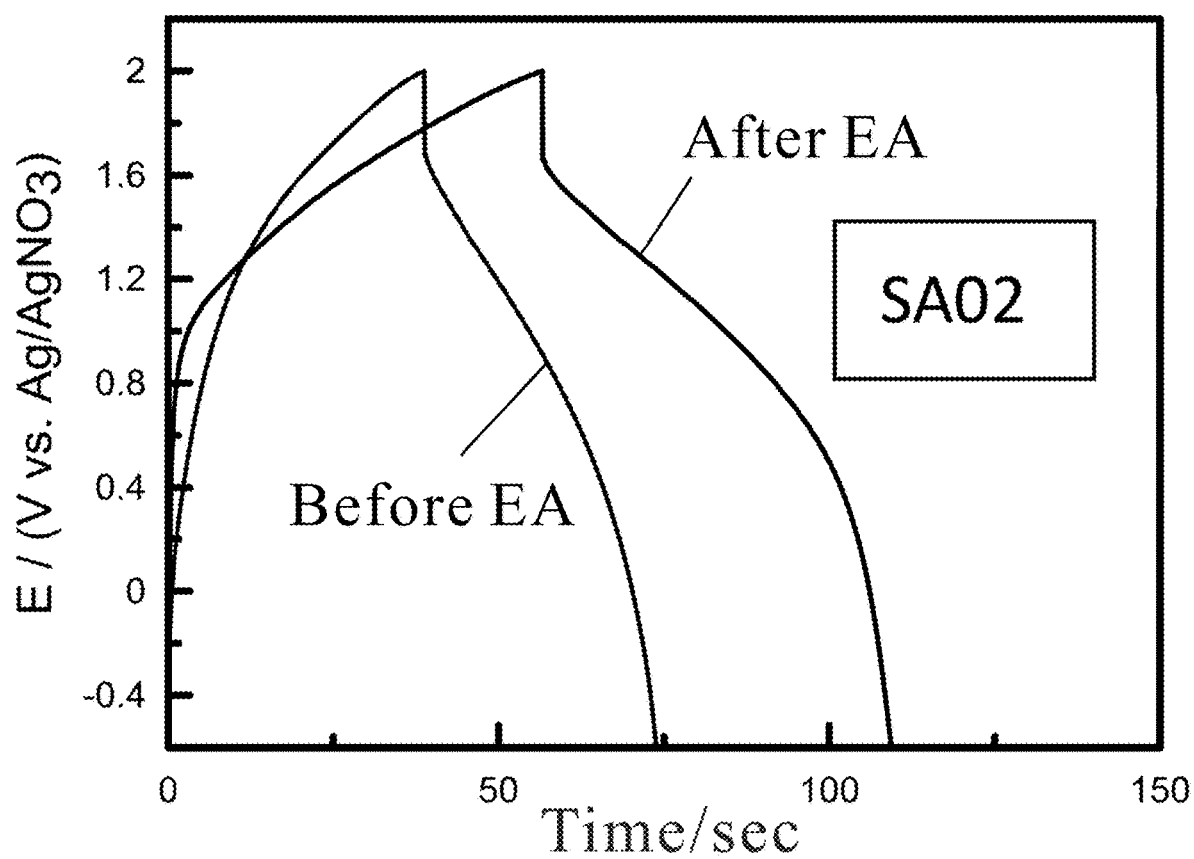
FIG. 12C is a constant current charging and discharging diagram illustrative of the initial soft carbon material (SA02) before and after the electrochemical activation according to the present disclosure.
Figure 12D:
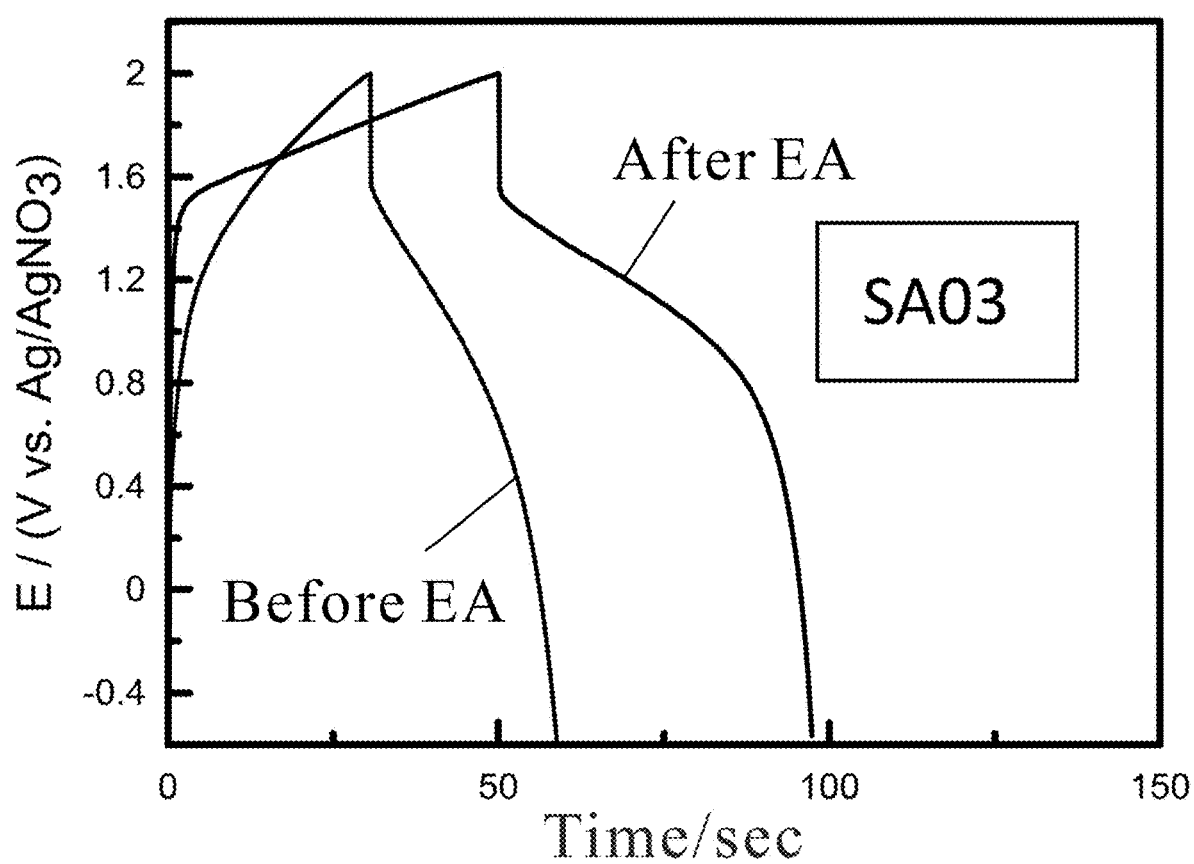
FIG. 12D is a constant current charging and discharging diagram illustrative of the initial soft carbon material (SA03) before and after the electrochemical activation according to the present disclosure.
Figure 12E:
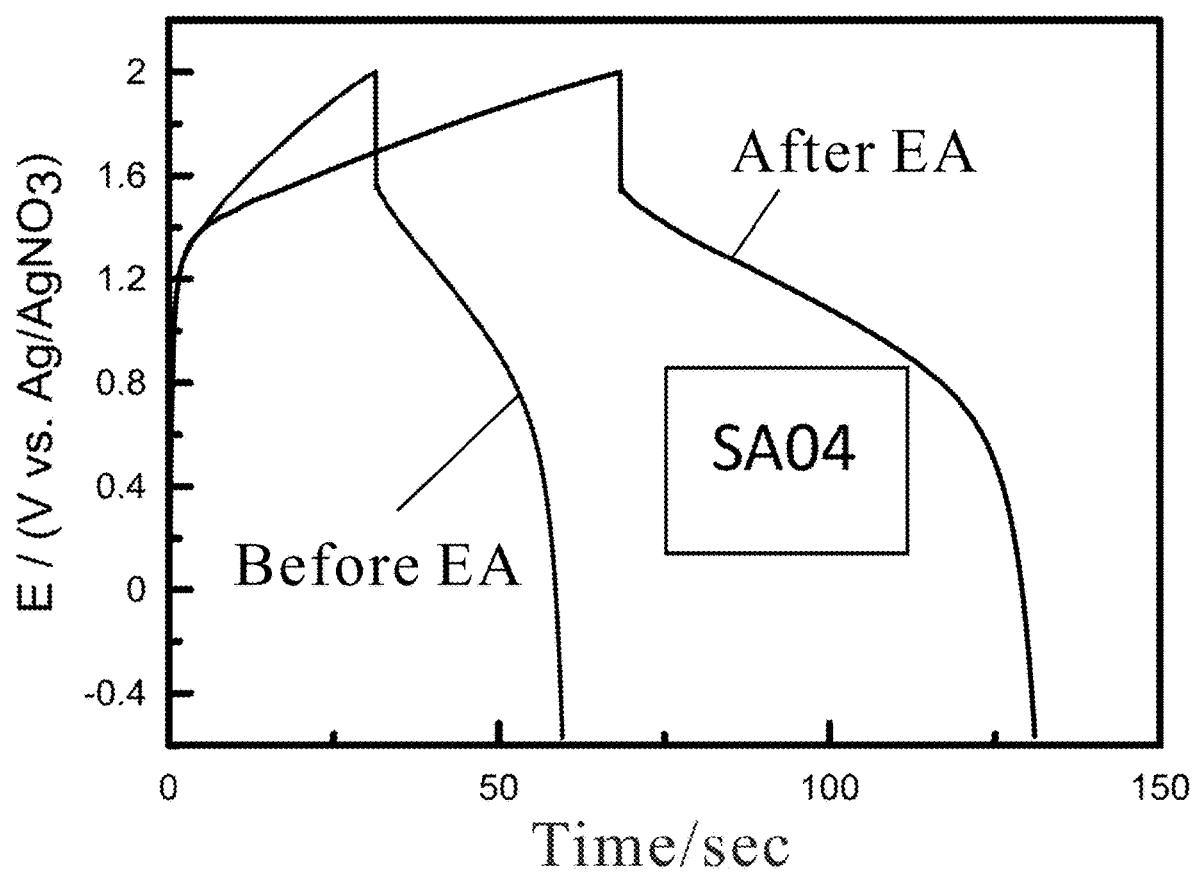
FIG. 12E is a constant current charging and discharging diagram illustrative of the initial soft carbon material (SA04) before and after the electrochemical activation according to the present disclosure.

Referring to FIG. 11, it shows a CV (at 10 mV/s) illustrative of differences in graphite before and after the EA step according to the present disclosure. The graphite (CPCB) is tested to be compared with the initial soft carbon materials.

As shown in FIG. 11, the graphite (CPCB) has a more complete crystalline structure than the initial soft carbon materials in $L_a$ and $L_c$ directions (see Tables 1 and 2). Furthermore, the CV in FIG. 11 shows that the graphite (CPCB) only has an oxidation peak and a reduction peak which show that current tends to increase with potential. Specifically, the oxidation and reduction peaks are not symmetric because the oxidation peak is located at 1.4 V (vs. Ag/AgNO$_3$) and the reduction peak is centered at 1.0 V (vs. Ag/AgNO$_3$), and thus, current features of ion injection above 1.4 V (vs. Ag/AgNO$_3$) are not conspicuous, which may be related to the too small spacing between graphene layers in the graphite (CPCB).

As shown in FIG. 11, after the EA process, there is no conspicuous change in the electrochemistry characteristics of the graphite (CPCB) because the crystalline structures of the graphite (CPCB) in directions $L_a$ and $L_c$ are 2D structures rather than 3D structures. Since EA mainly relies on ion injection and ejection to activate the carbon materials and the graphene layer spacing of graphite is small, it is difficult to perform effective EA on graphite. By contrast, the five initial soft carbon materials with different crystalline sizes are in the form of a 3D structure (i.e., random orientation of the crystalline domains); this, coupled with the fact that there is almost no variation of crystalline structures in direction $L_a$ but there are variations of the crystal size in direction $L_c$ and the fact that the carbon layer spacing is large, makes it easy for EA; i.e., ions are able to be injected into and ejected from the initial soft carbon materials to achieve activation. As shown in Table 5, after the EA step, percentage of increase in the specific capacitance of the initial soft carbon materials changes from 42% to 222%. The number of carbon layers affects ion injection/ejection, and thus affects the specific capacitance.

FIG. 12 is a constant current charging and discharging (CP, chronopotentiometric) diagram illustrative of differences in the initial soft carbon materials (CPCA, SA01~SA04) before and after EA according to the present disclosure. Table 6 shows the specific capacitance and coulombic efficiency from the CP method for the five initial soft carbon materials with different crystalline degrees according to the present disclosure. The calculation of the specific capacitance is described above, where the coulombic efficiency is discharging time/charging time.

The CP diagrams before and after EA are superimposed to obtain FIG. 12A to 12E. As shown in FIG. 12A to 12E, the effect of the high-voltage ion injection on increasing the ion accommodation sites of the initial soft carbon materials (CPCA) is not significant, and the specific capacitance is hardly changed, while this effect on increasing the specific capacitance of the initial soft carbon materials (SA02-SA04) is more obvious.

Table 6 is obtained by introducing the results of FIG. 12A to 12E into the equation and calculating the specific capacitance and coulombic efficiency. The percentage of increase in specific capacitance is the highest for the initial soft carbon material (SA02) and the lowest for the initial soft carbon material (CPCA). However, the soft carbon material (SA04), which has the greatest graphite crystallite layer number, has the highest absolute capacitance value, which is consistent with the CV diagrams. This confirms again that the greater graphene layer spacing $d_{002}$, the more effective the EA step, and that the larger the c-axis graphite-like crystals, the higher the specific capacitance. The initial soft carbon materials demonstrate a coulombic efficiency greater than 90%, except that the initial soft carbon material (SA01) demonstrates a coulombic efficiency of just 83% after EA. All the five initial soft carbon materials demonstrate significant potential drop (IR-drop), which may result from that no carbon black is introduced as an conductive agent or the structure of the graphite-like crystallites is incomplete, resulting in poor conductivity.

Table 6 further shows that all the initial soft carbon materials upon the EA step (without the alkaline activation first) demonstrate an increase in specific capacitance at a current density of 1 A/g, wherein the initial soft carbon material (SA02), the initial soft carbon material (SA03) and the initial soft carbon material (SA04) demonstrate a significant increase in specific capacitance. After the EA step, only the initial soft carbon material (CPCA) demonstrates a small increase in the coulombic efficiency (increasing from 94% to 96%), but the initial soft carbon materials (SA01~SA04) demonstrate a coulombic efficiency decrease of 1%-12%.

TABLE 6

| current density = 1 A/g | | CPCA | SA01 | SA02 | SA03 | SA04 |
|---|---|---|---|---|---|---|
| specific capacitance (F/g) | before EA | 0.65 | 2.77 | 5.92 | 6.12 | 11.04 |
| | after EA | 1.2 | 2.9 | 20.2 | 18.2 | 24.1 |
| coulombic efficiency (%) | before EA | 94 | 95 | 94 | 96 | 93 |
| | after EA | 96 | 83 | 93 | 94 | 92 |

The results from CP and CV methods are the same in terms of selection of a potential interval, wherein a current density of 1 A/g is used. Observation of the charging and discharging diagram (for example, FIG. 12A to 12E) of the five initial soft carbon materials with different crystalline sizes reveals the following: as soon as the charging begins, the electrode potential increases rapidly, which may result from the small specific surface area of the initial soft carbon materials. A change in the slope of the curve is accompanied by the behavior of ion injection, i.e., occurrence of intercalation onset potential (IOP). The greater the number of graphene crystalline layers is, the higher the IOP is. This is undesirable and may result from that inter-layer attraction between carbon atoms increases along with the increase of the number of graphene layers, thereby a higher onset potential is required for ion injection. As shown in Table 1, the average number of the graphene crystalline layers of the initial soft carbon materials is preferably less than 15. Upon commencement of ion injection, the potential starts to rise gently until it reaches a target potential, and this charging plateau is also conspicuous in the graphite material. The upper limit of the target potential is followed by the ejection plateau. However, the ejection plateau potential is different from the injection plateau potential, and the difference is revealed in the CV diagram, which explains why the potential of ion injection and ejection shows poor reversibility at a current density of 1 A/g.

Figure 13:
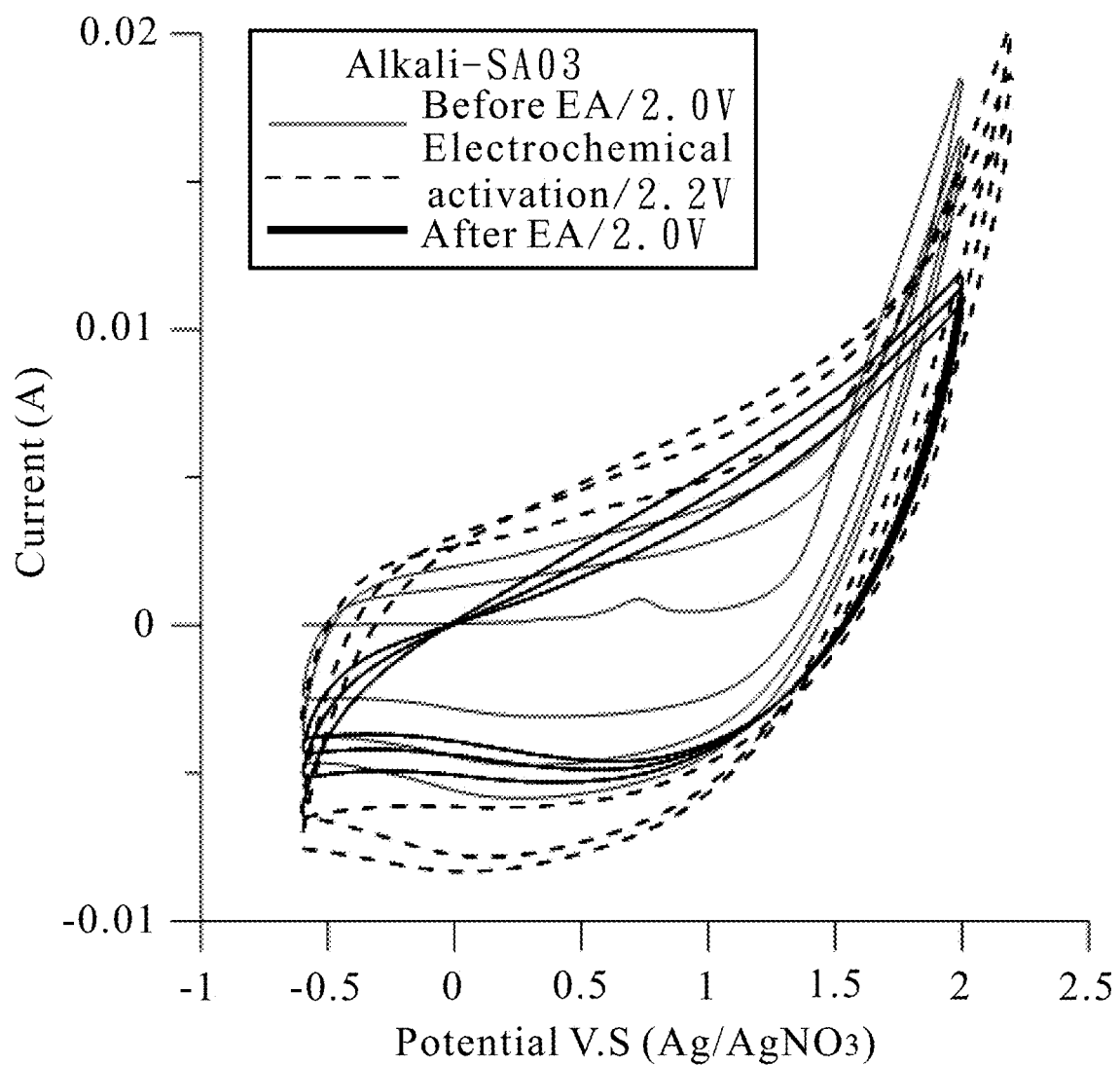
FIG. 13 is the cyclic voltammograms (CVs) illustrative of differences in the initial soft carbon material (SA03) before and after the electrochemical activation, after the alkaline activation.

Referring to FIG. 13, it shows a CV illustrative of differences in the initial soft carbon material (SA03) before and after EA, upon the alkaline activation. As shown in FIG. 13, a potential scan is carried out from the $E_{OCP}$ of around −0.6 V (vs. Ag/AgNO$_3$). At the beginning, current still approaches zero, and the capacitance attributed to the electric double-layer (EDL) is insignificant since the specific surface area of the initial soft carbon materials after alkaline activation is still small. A peak appears at a potential of around 0.7 V (vs. Ag/AgNO$_3$). At this potential, functional groups on the surface of the carbon materials are oxidized. After KOH activation, a series of activation reactions cause the carbon structure to have some oxygen-containing functional groups. This explains why the peak exists.

As soon as the potential increases to around 1.4 V (vs. Ag/AgNO$_3$), an ion injection peak appears, and then the current keeps increasing until it reaches a cut-off voltage. As regards the negative scan, the current increases significantly at around 1.4 V (vs. Ag/AgNO$_3$), as indicated by a slope climbing rightward, which is a typical EDL behavior. Therefore, at this moment, the discharging process is no longer associated with an ejection mode but is achieved by departure from the electrode material through ion desorption.

When the second cycle (internal cycle is first cycle outward gradually to become second cycle and third cycle) is scanned, the positive current is significantly greater than the current of the first cycle, indicating that the first potential scan forms active sites for ion adsorption/accommodation, and this current increases with the potential shift. The current keeps rising, indicating persistent ion injection. A conspicuous ion injection peak is found at high potentials, and the subsequent reduction current tends to increase. Regardless of whether the third scan is a positive scan or a negative scan, the current of the third cycle is greater than the current of the second sweep, indicating persistent ion injection and persistent electrode activation. When the voltage increases to 2.2 V (vs. Ag/AgNO$_3$), a higher current is attained, indicating that a higher potential attracts more anions to the electrode material. Afterward, the upper potential limit is regulated and decreased to 2.0 V (vs. Ag/AgNO$_3$).

The related diagrams are observed for the differences caused by the EA step. As regards the positive scan in the low potential region, the current is negative, but the current turns to be positive when the potential decreases to 0 V (vs. Ag/AgNO$_3$). Therefore, before the potential decreases to 0 V (vs. Ag/AgNO$_3$), ion desorption and ejection remains despite the positive scan, which may be due to the following two reasons. First, EA occurs at a potential of 2.2 V (vs. Ag/AgNO$_3$), and some ions are injected into carbon layers deeply, and thus when the positive scan starts, the potential is still insufficient to eject ions from the space between carbon layers. Second, a too high EA potential causes damages to the electrodes, for example, causing the electrode material to peel off from the substrate and thus causing increase of the voltage drop (IR-drop), thereby leading to poor conductivity. In short, CV reveals that the EA mechanism for the KOH-activated soft carbon materials is ion injection at high potentials, which establishes ion adsorption/accommodation active sites to obtain the EDL-like currents.

Figure 14:
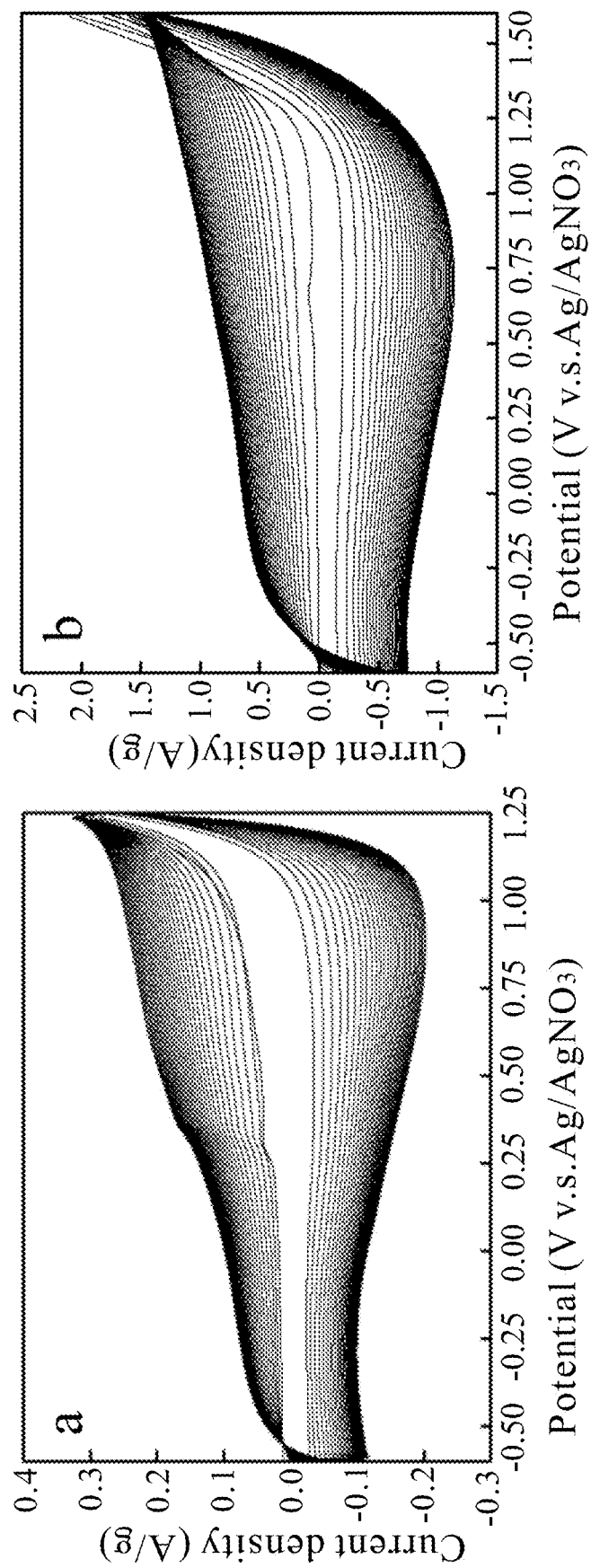
FIG. 14 shows the effect of intercalation onset potential (IOP) on the cyclic voltammograms (CVs) of alkali-processed-SA03, where (a) indicates the situation of upper potential limit 1.25 V (vs. Ag/AgNO$_3$) less than IOP=1.3 V (vs. Ag/AgNO$_3$), and (b) indicates the situation of an upper potential limit of 1.6 V (vs. Ag/AgNO$_3$) greater than IOP=1.3 V (vs. Ag/AgNO$_3$).
Figure 15:
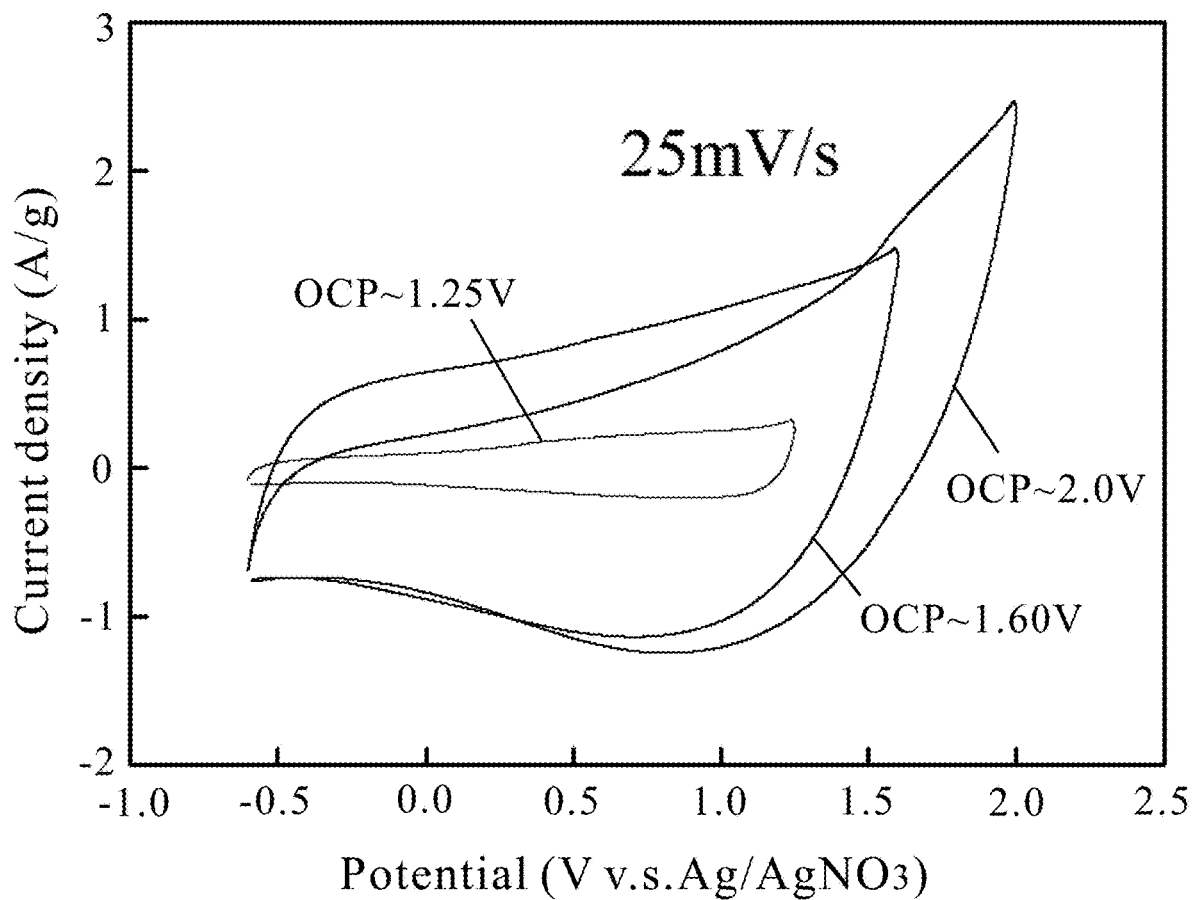
FIG. 15 is a schematic view for the effect of different upper potential limits on electrochemical behavior of alkali-processed-SA03.

FIG. 14 shows the effect of intercalation onset potential (IOP) on the CV curve of alkali-processed-SA03, where FIG. 14(a) indicates the situation of a upper potential limit of 1.25 V (vs. Ag/AgNO$_3$) less than IOP=1.3 V (vs. Ag/AgNO$_3$), and FIG. 14(b) indicates the situation of the upper potential limit of 1.6 V (vs. Ag/AgNO$_3$) greater than IOP=1.3 V (vs. Ag/AgNO$_3$). FIG. 15 shows the effect of upper potential limits on the electrochemical behavior of alkali-processed-SA03.

As shown in FIG. 13, the constant current charging and discharging diagram reveals the following: electrolyte ions are injected into the electrode material to initiate EA as soon as the electrode material is charged for the first time and the upper potential limit exceeds the IOP (around 1.3 V (vs. Ag/AgNO$_3$)) of the electrode material. This indicates that during the charging process, the feasibility of EA depends on whether the potential is greater than the IOP or not. As shown in FIG. 14, CV is carried out in order to determine whether the two upper potential limits (1.25 and 1.6 V (vs. Ag/AgNO$_3$)) exceed the IOP.

As shown in FIG. 14, the currents shown in the CV diagrams in (a) and (b) increase with the number of scans, thereby ensuring EA regardless of whether the upper potential limit is greater than or less than IOP. However, the resultant currents differ in intensity. The currents generated when the upper potential limit is less than the IOP are much less than the currents generated when the upper potential limit is greater than the IOP. This indicates that EA is significant when the upper potential limit is greater than the IOP.

The two CV diagrams differ in shape. Although both the two CV diagrams demonstrate the success of EA, the two CV diagrams have irregular shapes when the upper potential limit is less than the IOP and have regular shapes when the upper potential limit is greater than the IOP. This confirms, once again, that ion adsorption/accommodation active sites are effectively formed when the potential exceeds the IOP to affect the EA.

As shown in FIG. 15, during the potential scan, the feasibility of EA depends on whether the potential exceeds the IOP or not. Another upper potential limit of 2.0 V (vs. Ag/AgNO$_3$) is added to FIG. 15. Not only are the CV diagrams at the upper potential limit of 2.0 V (vs. Ag/AgNO$_3$) less regular than the CV diagrams at the upper potential limit of 1.6 V (vs. Ag/AgNO$_3$), but also the resultant current of the former is lower than the resultant current of the latter during the positive scan. Given the upper potential limit of 2.0 V (vs. Ag/AgNO$_3$), it is only when the potential reaches −0.3 V (vs. Ag/AgNO$_3$) that a positive current appears, which may be due to the following two reasons. First, a too high potential causes ions to be injected into the graphite-like crystallites deeply, which makes ejection difficult and requires a higher driving force. Second, the activated material may be peeled off from the carbon-coated aluminum foil, thereby increasing the contact resistance.

Figure 16:
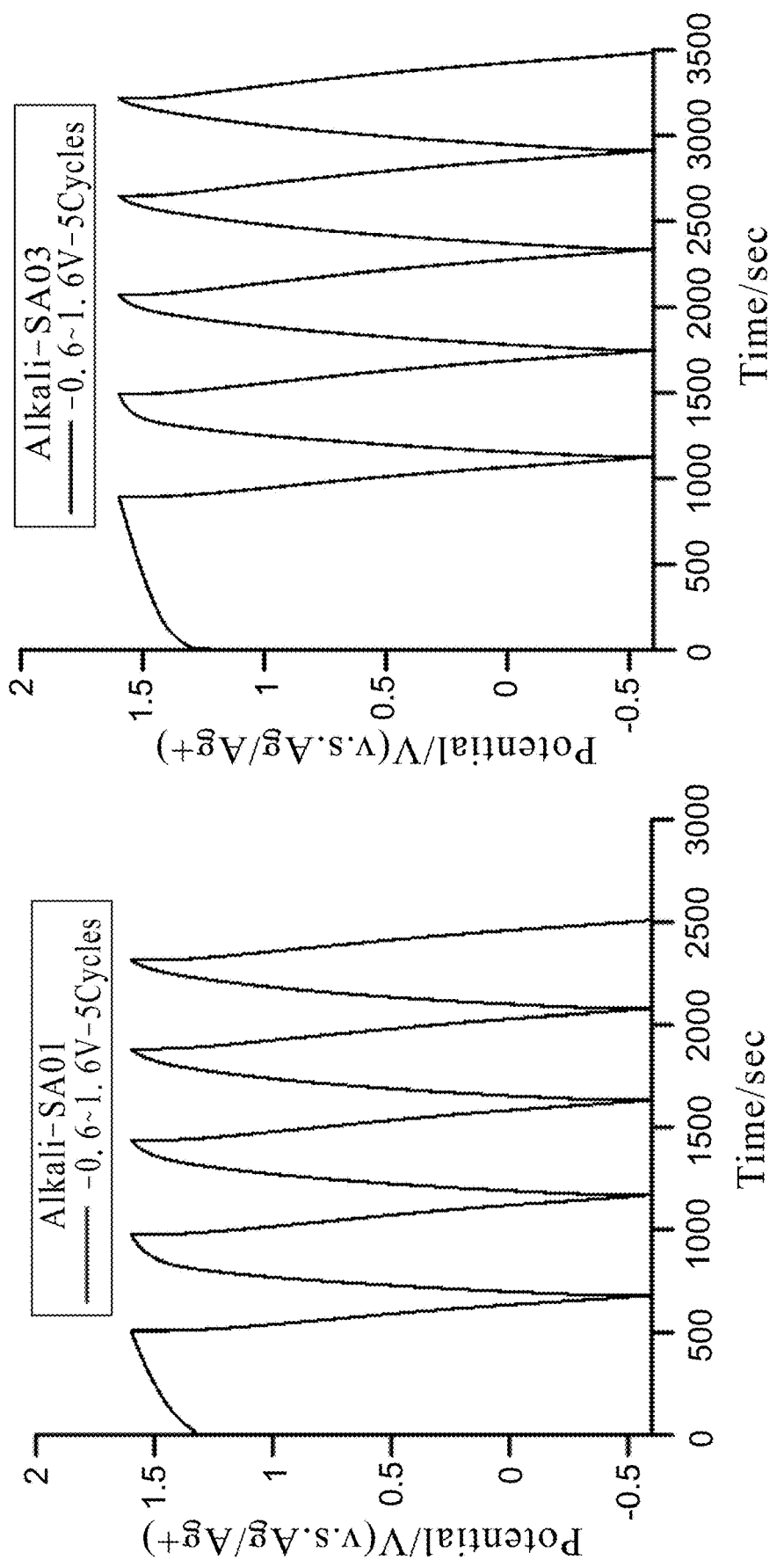
FIG. 16 is a graph of constant current (1 A/g) charging and discharging curves of alkali-processed-SA01 and alkali-processed-SA03.
Figure 17:
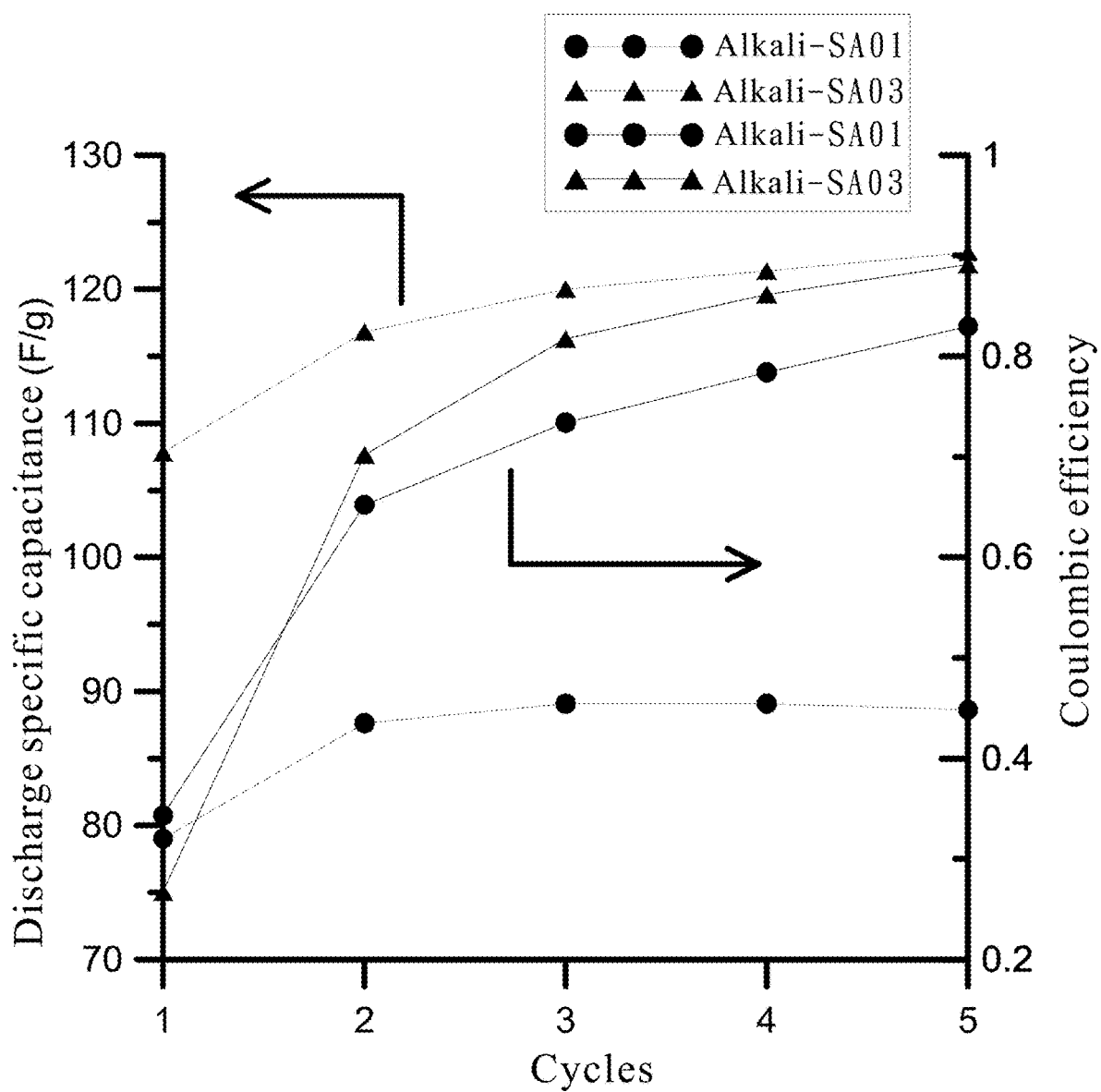
FIG. 17 is a schematic view illustrative of differences in specific capacitance and coulombic efficiency between alkali-processed-SA01 and alkali-processed-SA03.

FIG. 16 shows the constant current (1 A/g) charging and discharging curves of alkali-processed-SA01 and alkali-processed-SA03. FIG. 17 shows the difference in specific capacitance and coulombic efficiency between alkali-processed-SA01 and alkali-processed-SA03.

Therefore, the IOP has an effect on the EA of alkali-processed-SA03, and the IOP is the potential at which ions begin to undergo injection and activate the electrode materials, and thus relates to the microstructure of the electrode materials. To explore the relationship between the microstructure of different materials and the IOP, the initial soft carbon material (SA01) which has a small graphene layer number is illustrated in another embodiment, wherein after the alkaline activation step (S2) is carried out with KOH, alkali-processed-SA01 and alkali-processed-SA03 are compared.

FIG. 16 shows constant current (1 A/g) charging and discharging curves of alkali-processed-SA01 and alkali-processed-SA03, wherein the charging and discharging processes are carried out for five cycles. To prevent the potential drop (IR-drop) from affecting test results, the upper potential limit is 1.6 V (vs. Ag/AgNO$_3$). As shown in FIG. 16, there is no difference in the IOP between alkali-processed-SA01 and alkali-processed-SA03, as the IOP for both is 1.3 V (vs. Ag/AgNO$_3$). The first irreversible charging duration of alkali-processed-SA03 is around 1150 seconds, i.e., longer than the first irreversible charging duration (around 700 seconds) of alkali-processed-SA01. This indicates that alkali-processed-SA03 takes more time to undergo the EA, which may result from that the initial soft carbon material (SA03) contains more layers of graphite-like crystallites, thereby resulting in more adsorption/injection active sites formed with electrolyte ions after KOH activation and longer first irreversible charging duration.

There is little difference in the shape of the charging and discharging diagrams of subsequent cycles between alkali-processed-SA01 and alkali-processed-SA03, as they are typical DL charging and discharging curves; however, there is much difference in the capacitance between alkali-processed-SA01 and alkali-processed-SA03. Given a related equation, the fifth-cycle specific capacitance of alkali-processed-SA01 is 88.18 F/g, and the fifth-cycle specific capacitance of alkali-processed-SA03 is estimated to be 121.82 F/g. This confirms, once again, that the larger the graphite-like crystallites are upon the KOH activation, the more the ion injection/ejection or adsorption/desorption active sites are formed, and the higher the specific capacitance is.

FIG. 17 is obtained from FIG. 16. As shown in FIG. 17, during the first discharging process, alkali-processed-SA03 has a high specific capacitance which increases with the cycle number. Although the specific capacitance of alkali-processed-SA01 also increases with the cycle number, it cannot be greater than 90 F/g. The coulombic efficiency of alkali-processed-SA03 is low, i.e., around 75%, during the first charging and discharging cycle, keeps increasing after the second cycle, and reaches 90% at the fifth cycle. By contrast, although alkali-processed-SA01 has a slightly higher coulombic efficiency at the first cycle than alkali-processed-SA03, alkali-processed-SA01 has a lower coulombic efficiency at subsequent charging and discharging cycles than alkali-processed-SA03, for example, coulombic efficiency of around 82% at the fifth cycle. Therefore, the aforesaid result shows that after the KOH activation, the initial soft carbon material which has more graphite-like crystallites (for example, the initial soft carbon material SA03) not only attains a higher specific capacitance but also attains a higher coulombic efficiency.

The charge storage mechanisms of the initial soft carbon material which has been electrochemically activated and the initial soft carbon material which has been alkaline-activated and electrochemically activated are described below.

If only the EA of highly positive potentials is performed on the initial soft carbons, the preliminary ion injection/ejection mechanism can be formed, but the specific capacitance is still insufficient. To further increase the specific capacitance, the alkaline activation is performed on the initial soft carbon materials, such that some amorphous carbon is removed from the surfaces of the initial soft carbon materials by alkali-based fine etching thereon so as to obtain the first processing carbon material, facilitate the injection/ejection of ions, and further enhance electrochemical properties (specific capacitance) thereof. After the alkaline activation step (KOH), the soft carbon materials can provide more ion injection and/or accommodation sites and ion adsorption active sites, and then after the EA step, the resultant material structure obtains a carbon layer spacing formed by injection of electrolyte ions (for example, $BF_4^-$). This confirms that intercalation onset potential (IOP) affects the specific capacitance.

The relationship between the technical features obtained from the aforesaid two processes and the carbon material structure, for example, the intensity ratio of crystal plane (002) to crystal plane (101) in terms of carbon layer alignment and material structure, d-spacing between carbon layers, $L_c$ in the direction of crystal plane (002) c-axis, and $L_a$ in the direction of crystal plane (101), is discussed below.

1. Carbon Layer Alignment

The EA is performed by injection/ejection of ions. In the course of ion activation of the carbon materials, if injection/ejection of ions into/from a carbon material in the direction of carbon layers (also known as alignment) is limited, the carbon material is not easily activated electrochemically by ions.

Figure 18:
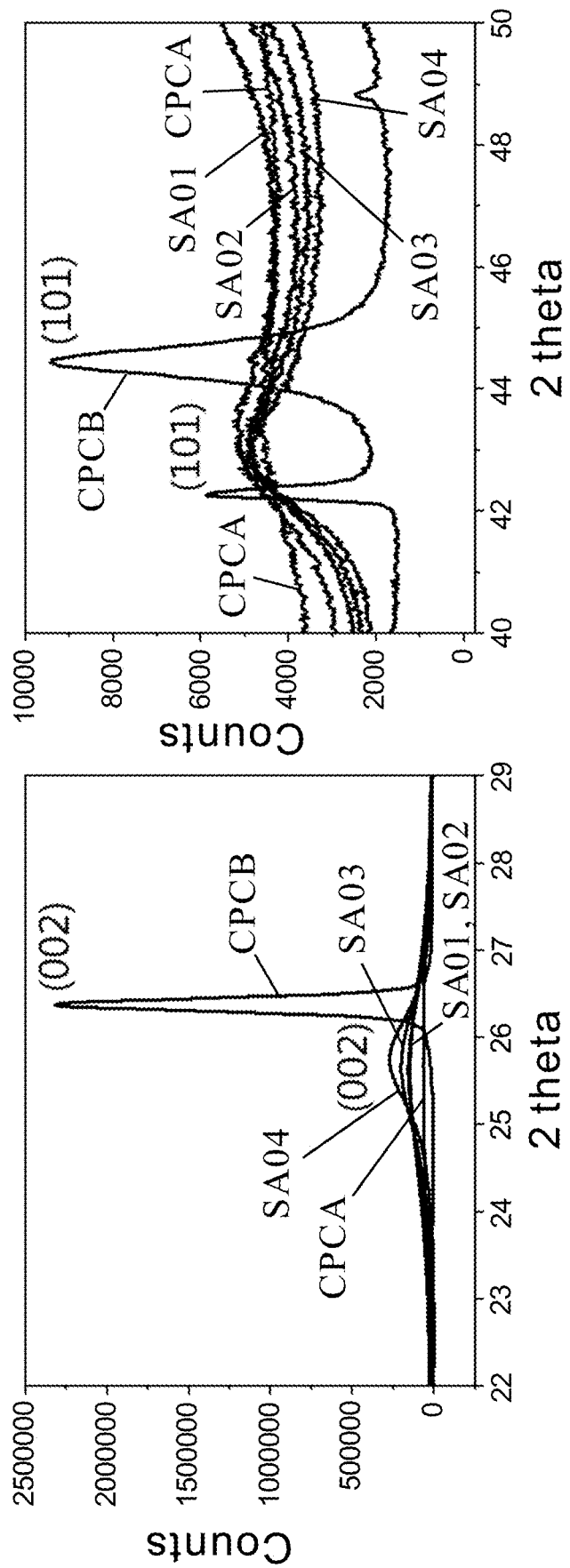
FIG. 18 is a schematic view of alignment indices for analyzing the material microstructure by XRD.

Referring to FIG. 18, it shows alignment indices for analyzing a material structure by XRD, wherein each alignment index is the intensity ratio ($I_{(002)}/I_{(101)}$) of crystal plane (002) to crystal plane (101). As shown in FIG. 18, when the intensity ratio of crystal plane (002) to crystal plane (101), as evaluated by XRD analysis, serves as an alignment index, the alignment indices of the initial soft carbon material (CPCA), the initial soft carbon material (SA01), the initial soft carbon material (SA02), the initial soft carbon material (SA03) and the initial soft carbon material (SA04) are 13, 26, 33, 44, and 57, respectively, i.e., each less than 60. By contrast, the alignment index of graphite is 247, i.e., much greater than 60. The alignment index is also stated in Table 7. Therefore, the greater the intensity of crystal plane (002) is, the greater the alignment indices are. This indicates that the material structure changes gradually from untidy (amorphous) crystallites to slightly orderly crystalline structures; hence, the graphite (CPCB) structure has a too great alignment index (greater than 60), and thus graphite is unlikely to undergo the EA process through ion intercalation, without considering the difficulty in injection/ejection of ions. Therefore, the alignment indices (the intensity ratio ($I_{(002)}/I_{(101)}$)) of crystal plane (002) to crystal plane (101) of a material structure) of the initial soft carbon materials of the present disclosure are less than 60.

Figure 19:
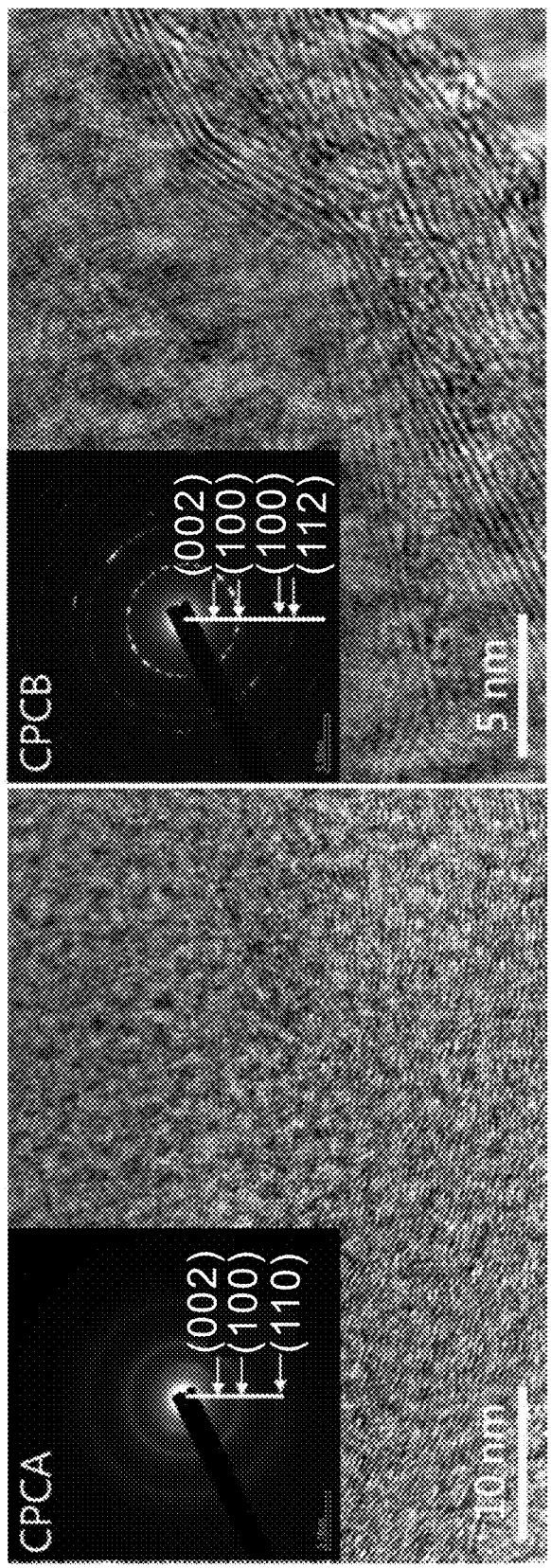
FIG. 19 shows the high-resolution transmission electron microscopy (HRTEM) images of the initial soft carbon material (CPCA) and the graphite (CPCB).

FIG. 19 shows images of the initial soft carbon material (CPCA) and the graphite (CPCB) taken with high-resolution transmission electron microscopy (HRTEM). The HRTEM images give an insight into the arrangement of crystallites. As shown in FIG. 19, the microscopic structure of the initial soft carbon material (CPCA) consists of crystallites arranged in a disordered manner, and the arrangement of crystallites in all directions is like the pattern of an electron diffraction diagram. Therefore, the initial soft carbon material (CPCA) has graphene layer crystallites arranged in a disordered manner. By contrast, the graphite (CPCB) consists of large crystallites, not all of which look round in shape in an electron diffraction diagram; instead, it contains fixed diffraction points.

Therefore, the carbon layer material structure of graphite (CPCB) is tidy.

2. Carbon Layer Spacing (d-Spacing)

Table 7 shows the specific capacitance of a carbon layer structure before and after the EA step. As shown in Table 1 and Table 7, the layer spacing $d_{002}$ of the initial soft carbon materials (CPCA, SA01-SA04) is 3.498 Å-3.503 Å, wherein the layer spacing $d_{002}$ of the initial soft carbon material (SA02) is 3.531 Å, and the layer spacing of the initial soft carbon material (SA04) is 3.503 Å. This indicates that the promotion percentage in the specific capacitance increases with the carbon layer spacing, and thus the promotion percentage in the specific capacitance of the initial soft carbon material (SA02) is the highest. Therefore, the EA step requires a relatively greater carbon layer spacing in order for ions to be injected and ejected for activation.

soft carbon materials of the present disclosure is around 50 Å, indicating almost no variation, despite there is an $L_c$ dimensional change (1852 Å). Although the layer spacing of the initial soft carbon material (SA02) is large, the carbon layers which can be activated are too small (i.e., small $L_a$), and its resultant specific capacitance after the EA step is low, i.e., only 8.488 F/g. By contrast, the resultant specific capacitance of the initial soft carbon material (SA03) and the initial soft carbon material (SA04) after the EA step are greater than 20 F/g.

Therefore, to attain an electrochemically activated carbon material with a higher specific capacitance, the carbon layer spacing needs to be large enough, and there should be sufficient carbon layers for EA. Accordingly, the initial soft carbon material (SA03) and the initial soft carbon material (SA04) in Table 7 are used in a preferred embodiment. Since the graphite (CPCB) has a small carbon layer spacing and a high alignment index for activating ions, its graphene layers cannot attain an effective EA, even though its $L_c$ is sufficiently large.

4. Alkaline Activation (KOH) on the Carbon Material Structure to Form More Ion Injection/Accommodation and Adsorption Active Sites As shown in Table 4, the initial soft carbon material (SA03) has a specific surface area of around 1.43 m$^2$/g and an average pore diameter of around 17 nm before the KOH activation and has a specific surface area of around 2.55 m$^2$/g (i.e., the specific surface area increases by two times approximately) and an average pore diameter of around 22 nm after the KOH activation. This indicates that alkaline activation step is effective in increasing ion injection and adsorption active sites and thus conducive to ion injection, thereby reducing the impedance of ion injection (see FIG. 4 and FIG. 7).

5. The Ion Intercalation Onset Potential (IOP) Against the Microstructure of the First Processing Carbon Material.

The alkaline activation is performed on the initial soft carbon materials of the present disclosure to form the first processing carbon material. Then, the EA is performed on the first processing carbon material (which is formed from the initial soft carbon material (SA03)) in which ion injection/accommodation and adsorption active sites are formed. The upper potential limit of EA must be at least 1.3 V (vs. Ag/AgNO$_3$) in order to achieve the preferred CV curves for the electrochemically activated carbons which have a low injection/ejection impedance and high specific capacitance and coulombic efficiency.

TABLE 7

| material | $d_{002}$(Å) | $L_c$(Å) | $L_a$(Å) | alignment ($I_{(002)}/I_{(101)}$) | specific capacitance (F/g) before EA | specific capacitance (F/g) after EA | percentage of increase (%) in capacitance |
|---|---|---|---|---|---|---|---|
| CPCA | 3.498 | 18.364 | 50.16 | 13 | 1.695 | 2.409 | 42.13 |
| SA01 | 3.509 | 22.362 | 50.51 | 26 | 2.274 | 4.712 | 107.28 |
| SA02 | 3.531 | 28.646 | 51.68 | 33 | 2.483 | 8.488 | 241.84 |
| SA03 | 3.511 | 39.389 | 50.73 | 44 | 6.241 | 20.156 | 222.96 |
| SA04 | 3.503 | 52.123 | 47.20 | 57 | 8.524 | 22.056 | 158.75 |
| CPCB | 3.369 | 278.500 | 1708.96 | 247 | — | — | — |

3. $L_c$ and $L_a$ of the Initial Soft Carbon Materials Respectively in the Direction of Crystal Plane (002) c-Axis and in the Direction of Crystal Plane (101)

Table 7 illustrates the effect of $L_c$ and $L_a$ on the specific capacitance of the initial soft carbon materials before and after the EA step. As shown in Table 7, the $L_a$ of the initial As shown in FIG. 15, when the upper potential limit is 2.0 V (vs. Ag/AgNO$_3$), the EA is attained but the CV curve is asymmetrical. In the course of a positive potential scan, it is only when −0.3 V (vs. Ag/AgNO$_3$) is reached, a positive current appears, indicating that injected ions need a higher positive potential in order to make the ions be ejected.

Figure 20A:
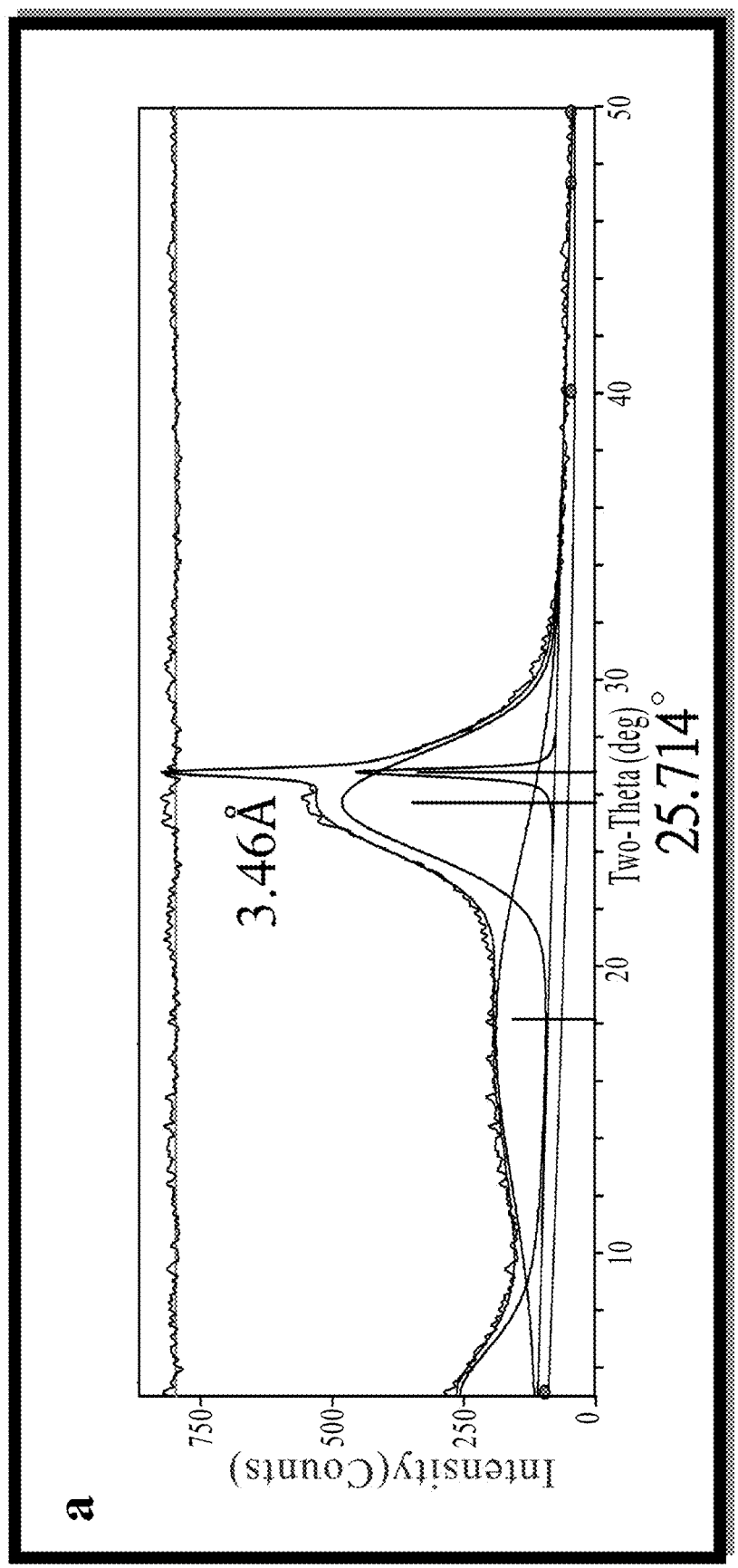
FIG. 20A is an X-ray diffraction diagram illustrative of differences in alkali-processed-SA03 before the electrochemical activation.
Figure 20B:
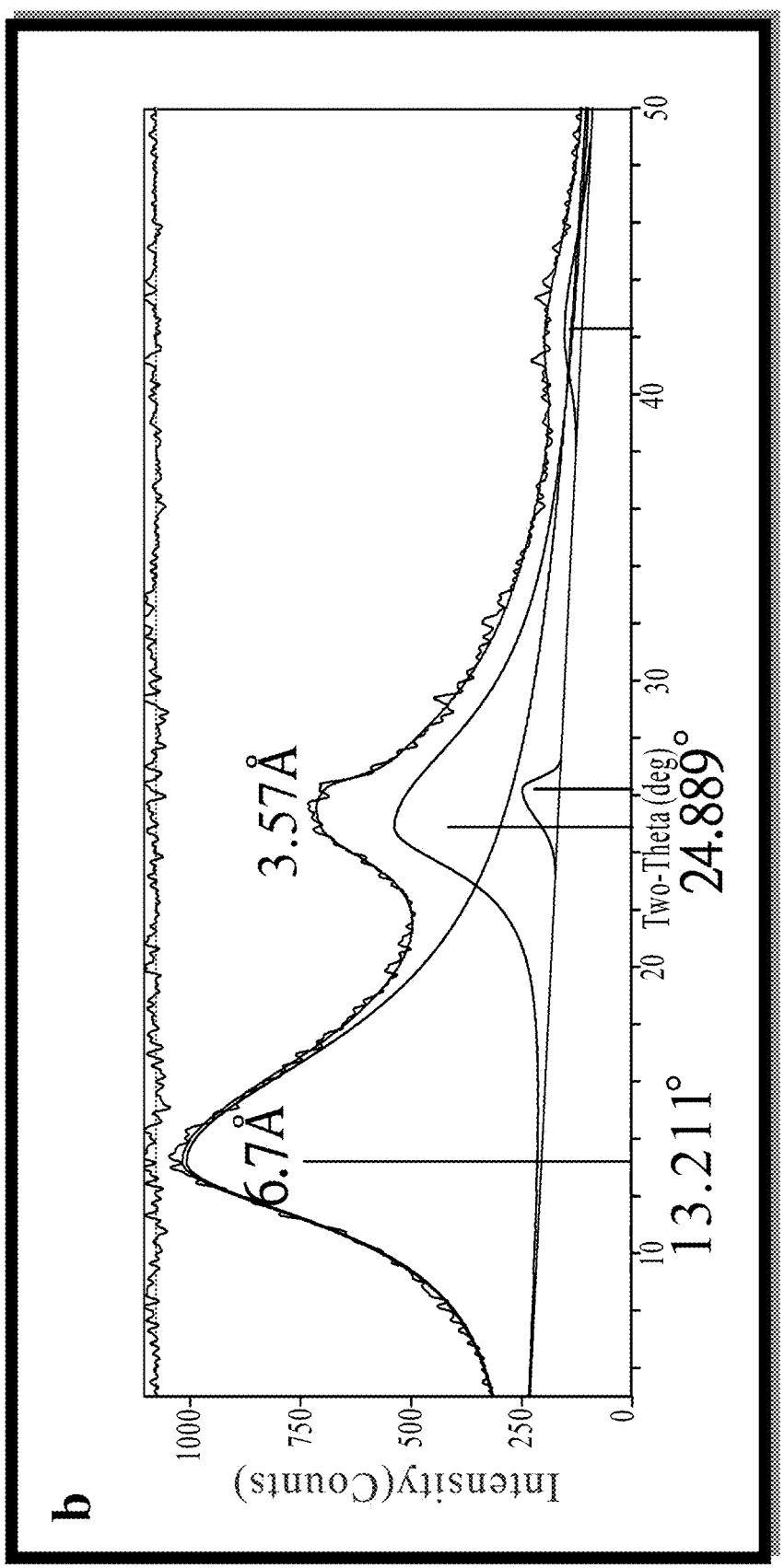
FIG. 20B is an X-ray diffraction diagram illustrative of differences in alkali-processed-SA03 after the electrochemical activation.

Referring to FIG. 20A to 20B, it shows an X-ray diffraction diagram illustrative of differences in alkali-processed-SA03 before and after the EA step, where FIG. 20A indicates the situation before the EA step, and FIG. 20B indicates the situation after the EA step. As shown in FIG. 20A, before the EA step, there is a substrate signal at 2θ (Two-Theta in FIG. 20A) of 26.78° and an initial graphite crystallite peak $d_{002}$ at 2θ of 25.71°

As shown in FIG. 20B, after the EA step, there is a feature peak at 2θ=13.21°, which is not visible before the EA, the crystallite layer spacing $d_{002}$ at 2θ=25.71° undergoes ion injection between the carbon layers to widen the layer spacing, thereby indicating that ions are injected into the space between the carbon layers to effect the EA. As shown in FIG. 20B, the initial peak $d_{002}$ at 2θ=25° does not disappear, indicating that some of the graphite-like crystallites still keep the initial layer spacing after the EA application. Referring to FIG. 20B, after the EA, the alkali-processed-SA03 has a diffraction peak at 13.211° as shown by the XRD analysis, and the carbon layer spacing is estimated to be 0.67 nm, i.e., "a second carbon layer spacing". In a preferred embodiment, the initial soft carbon material without the alkaline activation and EA steps has a first carbon layer spacing greater than 0.345 nm, and the soft carbon material upon the alkaline activation and EA has a second carbon layer spacing greater than 0.50 nm. The first carbon layer spacing is the carbon layer spacing of the soft carbon materials, i.e., the carbon layer spacing before alkaline activation and/or electrochemical activation. The second carbon layer spacing is the carbon layer spacing of the soft carbon materials which have undergone alkaline activation and electrochemical activation.

Fabrication of Asymmetrical Supercapacitors

Figure 21:
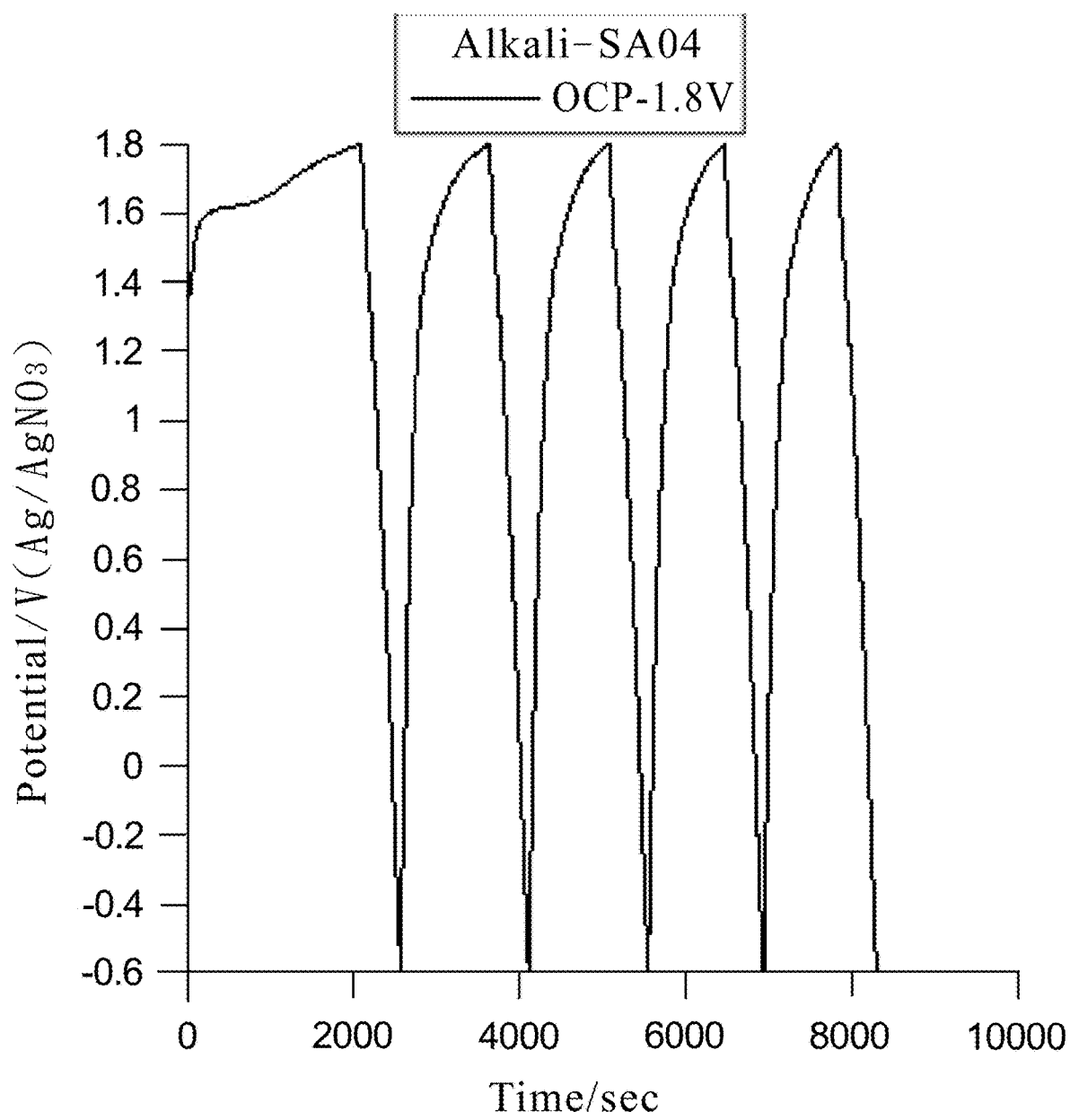
FIG. 21 is a constant current charging and discharging diagram, where the positive electrode is made of a first processing carbon material with the upper potential limit of 1.8 V (vs. Ag/AgNO$_3$).

Positive and negative electrodes of an asymmetrical supercapacitor are made of the first processing carbon material and commercially-available activated carbon, respectively. Selection of electrode potentials is very important for the assembly of supercapacitors. The criterion for selecting the positive electrode potential is maintenance of a high coulombic efficiency. Referring to FIG. 21, it shows a constant current (1 A/g) charging and discharging diagram, where the positive electrode is made of the first processing carbon material with the upper potential limit of 1.8 V (vs. Ag/AgNO$_3$). As shown in FIG. 21 and Table 8, after the alkaline activation and the high-voltage EA step (i.e., the first charging and discharging scan), the first processing carbon material performs satisfactory EDL behavior in a low potential range. However, in the course of subsequent charging and discharging cycles, when the charging potential is higher than 1.4 V (vs. Ag/AgNO$_3$), an ion injection plateau appears, because the first processing carbon material has an interlayer structure of a major crystallization part, such that an electrolyte attains a specific potential in the course of charging, and ion injection still occurs, wherein no otherwise corresponding conspicuous ejection plateau appears in the course of discharging, thereby leading to a low coulombic efficiency, namely 21.38% (first cycle), 42.98% (second cycle), and around 50% (third-fifth cycles). Since the ion injection plateau appears as soon as the charging potential is higher than 1.4 V (vs. Ag/AgNO$_3$), the positive electrode potential is preferably 1.4 V (vs. Ag/AgNO$_3$).

TABLE 8

| Cycle number | Specific capacitance (F/g) | Coulombic efficiency (%) |
| --- | --- | --- |
| 1 | 187.00 | 21.38 |
| 2 | 193.75 | 42.98 |

TABLE 8-continued

| Cycle number | Specific capacitance (F/g) | Coulombic efficiency (%) |
| --- | --- | --- |
| 3 | 194.58 | 48.39 |
| 4 | 190.00 | 49.19 |
| 5 | 194.58 | 52.00 |

Figure 22:
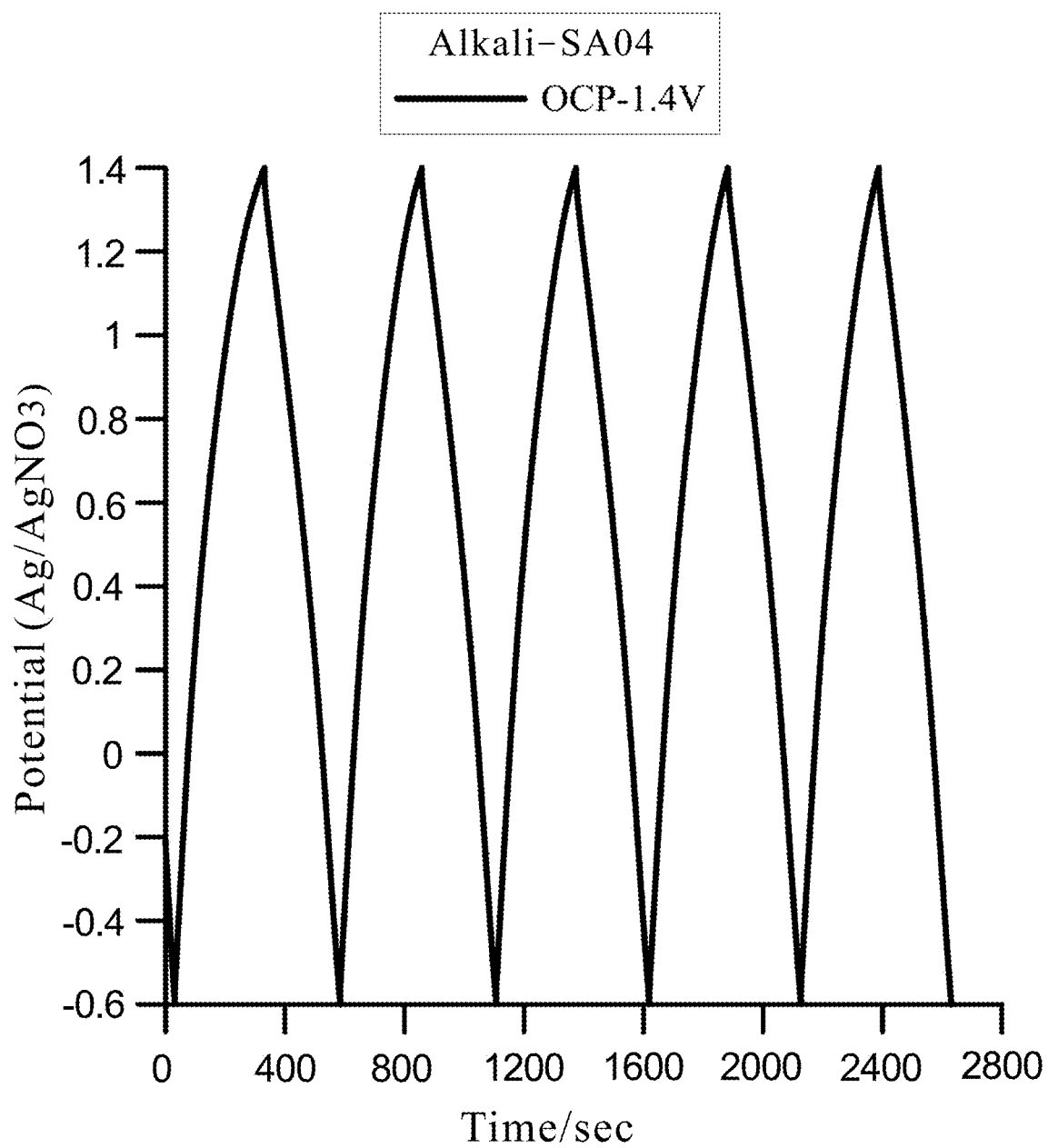
FIG. 22 is a constant current charging and discharging diagram, where the positive electrode is made of a soft carbon material operating at the upper potential limit of 1.4 V (vs. Ag/AgNO$_3$) and dedicated to high-voltage supercapacitors.

In a preferred embodiment of the present disclosure, the soft carbon materials for high-voltage supercapacitors serve as the positive electrode material of the asymmetrical supercapacitor, and the negative electrode material is activated carbon. Before 1.4 V (vs. Ag/AgNO$_3$) is used as the upper potential limit of the positive electrode, the EA application (constant current charging and discharging to 1.7 V (vs. Ag/AgNO$_3$) for five cycles) is performed on the electrodes (the first processing carbon material and the activated carbon). Referring to FIG. 22, it shows a constant current (1 A/g) charging and discharging diagram, where the positive electrode is made of the soft carbon material with a upper potential limit of 1.4 V (vs. Ag/AgNO$_3$) for the high-voltage supercapacitors. As shown in FIG. 22 and Table 9, the fifth cycle of charge-discharge yields the specific capacitance of 122 F/g and a coulombic efficiency of 94%. Therefore, the upper potential limit of 1.4 V for a positive electrode is required for desirable capacitance.

Table 9 and Table 6 are compared to provide the following illustrations. In the course of constant current (1 A/g) charging and discharging, if EA is performed on the initial soft carbon material (SA04) without alkaline activation, the specific capacitance of 24.1 (F/g) and a coulombic efficiency of 92% (i.e., 1% less than that before the EA) are obtained. By contrast, after the alkaline activation and EA, the soft carbon material (which is formed from the initial soft carbon material (SA04)) has its specific capacitance increased greatly to 122 (F/g) and the coulombic efficiency is increased to 94% (i.e., 1% greater than that before alkaline activation and EA). Therefore, the soft carbon materials upon the alkaline activation and EA are suitable to be used as a positive electrode material of the high-voltage supercapacitors.

TABLE 9

| | specific capacitance (F/g) | coulombic efficiency (%) |
| --- | --- | --- |
| alkali-processed-SA04 | 122 | 94% |

As revealed in Table 5, after undergoing EA via CV without the alkaline activation, the carbon material has the specific capacitance increased to a maximum of 20 F/g, which is less than the specific capacitance (122 F/g, see Table 9) of the soft carbon material upon both the alkaline activation and EA.

Figure 23:
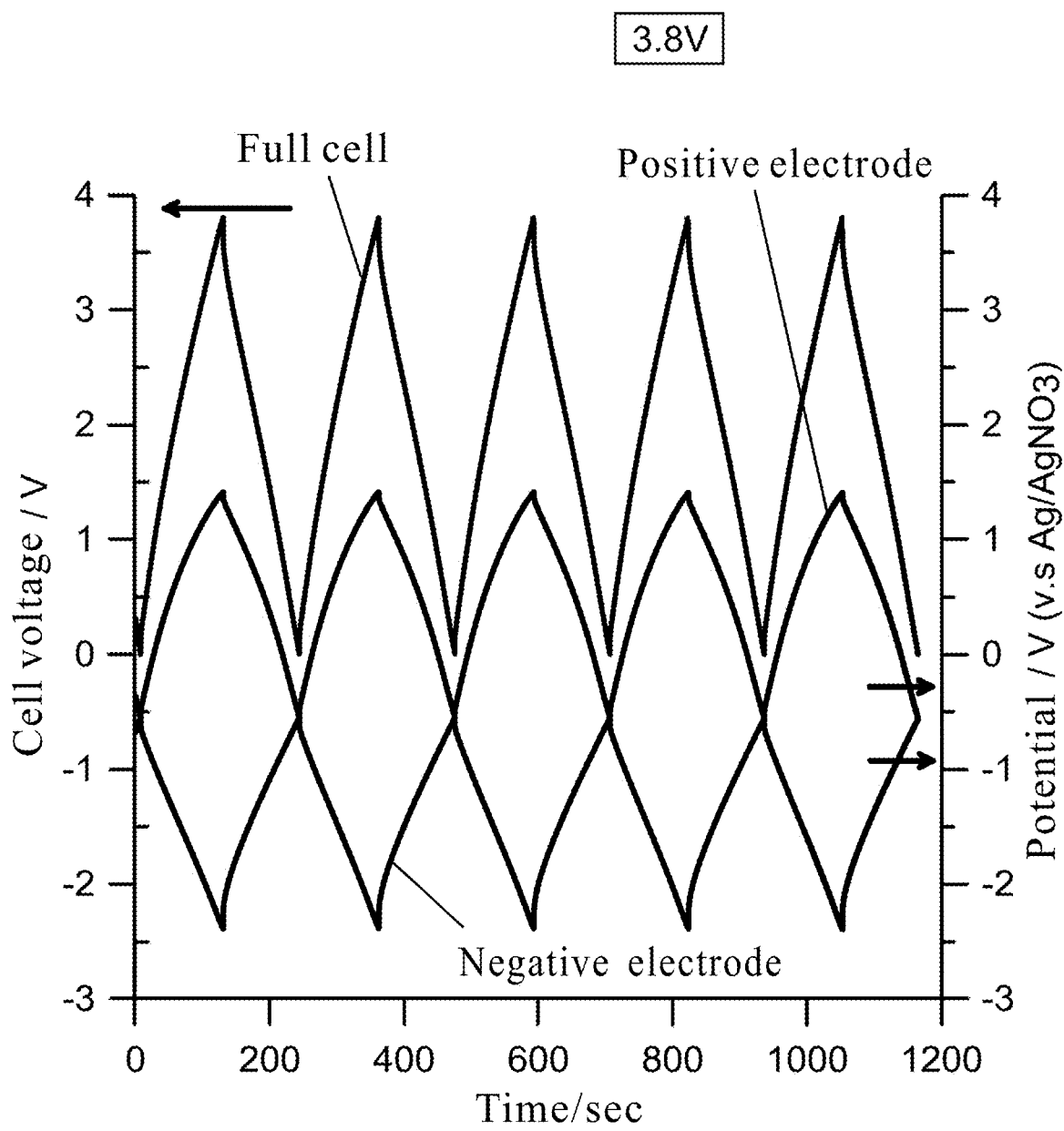
FIG. 23 is a constant current charging and discharging diagram of an asymmetrical supercapacitor.

Referring to FIG. 23, it shows a constant current (1 A/g$_{carbon}$) charging and discharging diagram of an asymmetrical supercapacitor, wherein the positive electrode is made of the first processing carbon material, and the negative terminal is made of activated carbon ACS25. Before the positive electrode is applied to the asymmetrical supercapacitor, the EA is performed with a three-electrode system on the first processing carbon material. Then, after the ion channels are formed, the negative electrode made of activated carbon and the positive electrode are put together to form the asymmetrical supercapacitor. As shown in FIG. 23 and Table 10, in the course of the charging and discharging of the first cycle through the fifth cycle, the asymmetrical supercapacitor has a coulombic efficiency of around 95% and a specific capacitance of around 30 F/g$_{carbon}$. To calculate the energy efficiency, the equation: energy density=½×Cs×U$^2$ is used, where Cs denotes specific capacitance (F/g), and U denotes the operating cell voltage (V). Given the equation, the energy density is estimated to be 58.16 Wh/kg$_{carbon}$.

TABLE 10

| cycle number | 1 | 2 | 3 | 4 | 5 |
|---|---|---|---|---|---|
| specific capacitance (F/g$_{carbon}$) | 29.84 | 29.84 | 29.82 | 29.74 | 29.47 |
| coulombic efficiency (%) | 92.27 | 95.86 | 96.43 | 96.58 | 95.81 |

If the energy density is based on the total mass of the device, the aforesaid energy density value can be divided by 4 (empirical value) to yield 15 Wh/kg or so. Therefore, the asymmetrical supercapacitor of the present disclosure has a greater energy density than conventional EDLCs (for example, the positive electrode is made of graphite, and the negative electrode is made of activated carbon, with energy density of around 5 Wh/kg). Since the asymmetrical supercapacitor of the present disclosure has a higher energy density, the asymmetrical supercapacitor in a preferred embodiment has an operating cell voltage (i.e., the sum of absolute value of positive terminal voltage and absolute value of negative terminal voltage) greater than 3.8 V.

An aspect of the present disclosure is accomplished in view of the aforesaid drawbacks of the prior art and intended to provide a method of preparing a soft carbon material for the high-voltage supercapacitors. The method involves performing an alkaline activation and an EA step on an initial soft carbon materials which differ in specific microstructure alignment, so as to attain a soft carbon material adapted for high-voltage supercapacitors and exhibit analogous EDLC symmetrical capacitor charging and discharging curves at a low specific surface area.

It is another aspect of the present disclosure to provide an asymmetrical supercapacitor made of the soft carbon material for high-voltage supercapacitors as a positive electrode material.

While the present disclosure has been described by means of specific embodiments, numerous modifications and variations could be made thereto by those skilled in the art without departing from the scope and spirit of the present disclosure set forth in the claims.

What is claimed is:

1. A method of preparing a soft carbon material for high-voltage supercapacitors, comprising:
providing an initial soft carbon material characterized by:
(A) a first carbon layer spacing greater than 0.345 nm but less than 0.360 nm; (B) a crystal plane (002) with a length (L$_a$) less than 6 nm; (C) a crystal plane (101) with a length (L$_a$) less than 6 nm; and (D) an intensity ratio (I$_{(002)}$/I$_{(101)}$) of the crystal plane (002) to the crystal plane (101) obtained by XRD analysis being less than 60;
performing an alkaline activation on the initial soft carbon material with an alkaline activator to obtain a first processing carbon material; and
performing an electrochemical activation on the first processing carbon material with an electrolyte to obtain the soft carbon material for the high-voltage supercapacitors.

2. The method of preparing a soft carbon material for high-voltage supercapacitors according to claim 1, wherein the alkaline activator is at least one selected from the group consisting of alkali metal hydroxide, alkali metal carbonate and alkali metal hydrogen carbonate.

3. The method of preparing a soft carbon material for high-voltage supercapacitors according to claim 1, wherein the first processing carbon material has a specific surface area less than 5 m$^2$/g and an average pore diameter less than 40 nm.

4. The method of preparing a soft carbon material for high-voltage supercapacitors according to claim 1, wherein the electrochemical activation comprises a cyclic voltammetric scan and a charging and discharging cycle, and the cyclic voltammetric scan is performed on the first processing carbon material for at least three times at 25 mV/s in a potential window of −0.6~2.2 V (vs. Ag/AgNO$_3$).

5. The method of preparing a soft carbon material for use in high-voltage supercapacitors according to claim 4, wherein the cyclic voltammetric scan is performed, at least three times, on the first processing carbon material at 25 mV/s in a potential window of −0.6~1.6 V (vs. Ag/AgNO$_3$).

6. The method of preparing a soft carbon material for high-voltage supercapacitors according to claim 1, wherein the electrolyte comprises TEABF$_4$ in the propylene carbonate.

7. The method of preparing a soft carbon material for high-voltage supercapacitors according to claim 1, wherein the soft carbon material has a second carbon layer spacing greater than 0.50 nm but less than 0.70 nm and is defined as carbon layer spacing of the soft carbon material which has undergone alkaline activation and electrochemical activation.

8. The method of preparing a soft carbon material for high-voltage supercapacitors according to claim 1, wherein the soft carbon material is used as a positive electrode material of an asymmetrical supercapacitor.

9. An asymmetrical supercapacitor, comprising:
a positive electrode material being the soft carbon material prepared by the method of any one of claim 1; and
a negative electrode material being activated carbon.

10. The asymmetrical supercapacitor according to claim 9, wherein the asymmetrical supercapacitor has an operating voltage greater than 3.8 V.

* * * * *